(12) United States Patent
Obayashi et al.

(10) Patent No.: US 10,043,300 B2
(45) Date of Patent: Aug. 7, 2018

(54) IMAGE PROCESSING APPARATUS, CONTROL METHOD, AND RECORD MEDIUM FOR SELECTING A TEMPLATE FOR LAYING OUT IMAGES

(71) Applicant: CANON KABUSHIKI KAISHA, Tokyo (JP)

(72) Inventors: Masaaki Obayashi, Kawasaki (JP); Fumitaka Goto, Tokyo (JP); Hiroyasu Kunieda, Yokohama (JP); Maya Kurokawa, Tokyo (JP); Yoshinori Mizoguchi, Tokyo (JP); Masao Kato, Kawasaki (JP); Tohru Ikeda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 64 days.

(21) Appl. No.: 15/384,740

(22) Filed: Dec. 20, 2016

(65) Prior Publication Data
US 2017/0186201 A1 Jun. 29, 2017

(30) Foreign Application Priority Data
Dec. 25, 2015 (JP) ................. 2015-255238

(51) Int. Cl.
*G06F 3/12* (2006.01)
*H04N 1/00* (2006.01)
(Continued)

(52) U.S. Cl.
CPC ............... *G06T 11/60* (2013.01); *G06F 3/14* (2013.01); *H04N 1/00442* (2013.01);
(Continued)

(58) Field of Classification Search
CPC ....... G06F 3/125; G06F 3/14; G06K 9/00228; G06T 11/60; G06T 2207/20221; H04N 1/00442; H04N 1/00453
See application file for complete search history.

(56) References Cited

U.S. PATENT DOCUMENTS

| 2005/0044485 A1* | 2/2005 | Mondry ............... G06Q 10/043 715/247 |
| 2006/0181736 A1* | 8/2006 | Quek ................... G03D 15/005 358/1.18 |

(Continued)

FOREIGN PATENT DOCUMENTS

JP 2014-16800 A 1/2014

OTHER PUBLICATIONS

Wang et al. ("Automatic digital photo-book making system," SPIE Proceedings vol. 7540, Feb. 10, 2010).*

(Continued)

*Primary Examiner* — Yubin Hung
(74) *Attorney, Agent, or Firm* — Canon U.S.A., Inc. IP Division

(57) ABSTRACT

An image processing apparatus includes a first acquiring unit, a second acquiring unit, an evaluating unit, a selecting unit, and an output unit. The first acquiring unit acquires a first template group and a second template group. The second acquiring unit acquires a first layout candidate information group based on the first template group and a second layout candidate information group based on the second template group. The evaluating unit evaluates a plurality of layout candidate information pieces at least including the first layout candidate information group and the second layout candidate information group to provide an evaluation. The selecting unit selects a template corresponding to one layout candidate information piece of the plurality of layout candidate information pieces evaluated by the evaluating (Continued)

unit based on the evaluation provided by the evaluating unit. The output unit outputs a layout result based on the template selected by the selecting unit.

17 Claims, 15 Drawing Sheets

(51) Int. Cl.
  *G06T 11/60* (2006.01)
  *G06F 3/14* (2006.01)
  *G06K 9/00* (2006.01)
(52) U.S. Cl.
  CPC .......... *G06F 3/125* (2013.01); *G06K 9/00228* (2013.01); *G06T 2207/20221* (2013.01); *H04N 1/00453* (2013.01)

(56) References Cited

U.S. PATENT DOCUMENTS

| 2011/0025709 A1* | 2/2011 | Ptucha | G06T 11/60 345/629 |
| 2011/0285748 A1* | 11/2011 | Slatter | G06T 11/60 345/629 |
| 2012/0206771 A1* | 8/2012 | Cok | G06T 11/60 358/1.18 |
| 2013/0314434 A1* | 11/2013 | Shetterly | G09G 5/14 345/593 |
| 2014/0013217 A1* | 1/2014 | Hashii | G06F 17/212 715/253 |
| 2015/0015919 A1* | 1/2015 | Anderson | H04N 1/00188 358/3.27 |
| 2015/0143256 A1* | 5/2015 | Panchawagh-Jain | H04L 51/08 715/752 |

OTHER PUBLICATIONS

Geigel et al. ("Automatic page layout using genetic algorithms for electronic albumin," Proc. SPIE. 4311, Internet Imaging II, Dec. 27, 2000).*
Cheatle et al. ("Faces from the web: automatic selection and composition of media for casual screen consumption and printed artwork," SPIE Proceedings vol. 7540, Feb. 10, 2010).*
Atkins et al. ("Templated recursive image composition," Proceedings of the 18th ACM international conference on Multimedia, Oct. 2010).*
Chao et al. ("Blocked recursive image composition with exclusion zones," Proceedings of the 10th ACM symposium on Document engineering, Sep. 2010).*
Rother et al. ("AutoCollage," ACM Transactions on Graphics, vol. 25, Issue 3, Jul. 2006).*

* cited by examiner

FIG. 5

| IMAGE ID | CAPTURING DATE/TIME | FOCUS | NUMBER OF FACES | PERSONAL ID ||||||||||
|---|---|---|---|---|---|---|---|---|---|---|---|---|
| | | | | 1 ||| 2 ||| 3 ||| |
| | | | | UPPER LEFT POSITION | LOWER RIGHT POSITION | | UPPER LEFT POSITION | LOWER RIGHT POSITION | | UPPER LEFT POSITION | LOWER RIGHT POSITION | |
| 1 | 7/1/2015 10h11m12s | YES | 6 | 40,40 | 65,65 | | 90,40 | 115,65 | | 10,20 | 25,35 | ... |
| 2 | 7/1/2015 10h12m30s | YES | 2 | 50,100 | 100,150 | | 150,150 | 190,165 | | 150,125 | 190,165 | ... |
| 3 | 7/1/2015 10h15m54s | YES | 0 | — | — | | — | — | | — | — | ... |
| ⋮ | ⋮ | ⋮ | ⋮ | ⋮ | ⋮ | | ⋮ | ⋮ | | ⋮ | ⋮ | ⋮ |

FIG. 7

| SCENE | CAPTURING PERIOD (TIME) | | NUMBER OF CAPTURED IMAGES (IMAGES) | | NUMBER OF CAPTURED PEOPLE (PEOPLE) | |
|---|---|---|---|---|---|---|
| | AVERAGE | NORMAL DEVIATION | AVERAGE | NORMAL DEVIATION | AVERAGE | NORMAL DEVIATION |
| TRAVEL | 33.221 | 4.778 | 324.857 | 393.691 | 1.506 | 0.256 |
| DAILY | 3.336 | 4.671 | 54.892 | 108.805 | 1.465 | 0.974 |
| CEREMONY | 4.634 | 1.532 | 165.457 | 71.055 | 2.547 | 0.527 |

FIG. 8A

| SCENE | IMAGE FEATURE IN MAIN SLOT | IMAGE FEATURE IN SUB-SLOT |
|---|---|---|
| TRAVEL | WIDE IMAGE SHOWING HUMAN FIGURE AND LANDSCAPE | ZOOMED IMAGE OR IMAGE SHOWING PROFILE |
| DAILY | ZOOMED IMAGE OR IMAGE SHOWING PROFILE | WIDE IMAGE SHOWING HUMAN FIGURE AND LANDSCAPE |
| CEREMONY | IMAGE SHOWING TWO PEOPLE IN CLOSE DISTANCE | IMAGE SHOWING MANY PEOPLE |

FIG. 8B

| IMAGE ID | SCORE (50-POINT SCALE) | |
|---|---|---|
| | MAIN SLOT (POINTS) | SUB-SLOT (POINTS) |
| 1 | 20 | 40 |
| 2 | 45 | 10 |
| 3 | 10 | 20 |
| ... | ... | ... |

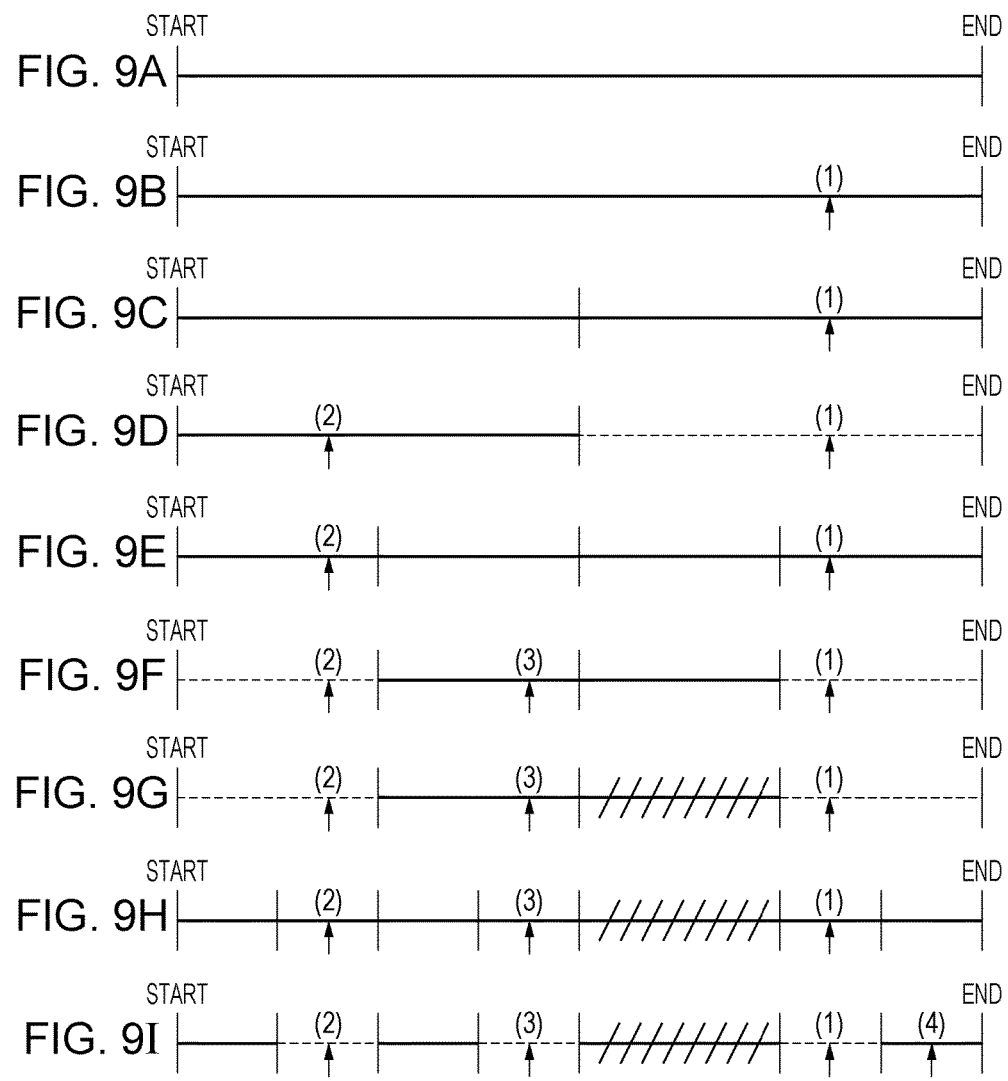

FIG. 12A

| IMAGE ID | CAPTURING DATE/TIME | FOCUS | NUMBER OF FACES | SCORE |
|---|---|---|---|---|
| 25 | 1/1/2015 12:00:00 | YES | 0 | 20 |
| 86 | 1/1/2015 13:00:00 | YES | 1 | 25 |
| 102 | 1/1/2015 16:00:00 | YES | 1 | 55 |
| 108 | 1/1/2015 18:00:00 | YES | 1 | 45 |
| 214 | 1/1/2015 22:00:00 | YES | 3 | 90 |

IMAGE INFORMATION

FIG. 12B

| TEMPLATE ID | NUMBER OF SLOTS | WIDTH | HEIGHT | SCORE |
|---|---|---|---|---|
| 1 | 3 | 297 | 210 | 80 |
| 2 | 3 | 297 | 210 | 45 |
| 3 | 3 | 297 | 210 | 60 |
| ... | ... | ... | ... | ... |
| 24 | 4 | 297 | 210 | 79 |
| ... | ... | ... | ... | ... |
| 47 | 5 | 297 | 210 | 98 |
| 48 | 5 | 297 | 210 | 90 |

TEMPLATE INFORMATION

FIG. 12C

| SLOT ID | CHRONOLOGICAL ORDER | PRIORITY LEVEL | SCORE |
|---|---|---|---|
| 1 | 1 | 2 | 25 |
| 2 | 2 | 2 | 30 |
| 3 | 5 | 1 | 100 |
| 4 | 3 | 2 | 60 |
| 5 | 4 | 2 | 50 |

SLOT INFORMATION

FIG. 12D

| SLOT ID | CHRONOLOGICAL ORDER | PRIORITY LEVEL | SCORE |
|---|---|---|---|
| 1 | 1 | 2 | 25 |
| 2 | 3 | 2 | 30 |
| 3 | 5 | 1 | 80 |
| 4 | 4 | 1 | 100 |
| 5 | 2 | 2 | 60 |

SLOT INFORMATION

SLOT ID

CHRONOLOGICAL ORDER

PRIORITY LEVEL

SCORE

IMAGE ID

SLOT ID

CHRONOLOGICAL ORDER

PRIORITY LEVEL

SCORE

IMAGE ID

| CATEGORY | ROUND | DIAMOND-SHAPED | TEMPLATE ID |
|---|---|---|---|
| 1 | | | 1 |
| 1 | | | 2 |
| ... | ... | ... | ... |
| 1 | | | 48 |
| 2 | YES | | 49 |
| 2 | YES | | 50 |
| ... | ... | ... | ... |
| 2 | YES | | 96 |
| 3 | | YES | 97 |
| 3 | | YES | 98 |
| ... | ... | ... | ... |
| 3 | | YES | 144 |

IMAGE PROCESSING APPARATUS, CONTROL METHOD, AND RECORD MEDIUM FOR SELECTING A TEMPLATE FOR LAYING OUT IMAGES

BACKGROUND OF THE INVENTION

Field of the Invention

An embodiment relates to an image processing apparatus for processing image data, a control method, and a record medium.

Description of the Related Art

A method has been known including laying out a plurality of image data pieces generated by an image generating apparatus such as a digital camera, a digital video camera, and a scanner in a predetermined template to generate various deliverables such as a collage and an album. Japanese Patent Laid-Open No. 2014-16800 proposes a method including laying out a predetermined number of images in one pre-selected template and outputting the generated layout result. However, according to Japanese Patent Laid-Open No. 2014-16800, one template to be utilized for generating such a layout result is selected in advance, and image data pieces to be laid out are then selected. This method disadvantageously outputs a layout result based on the one template selected in advance, even in a case where a more suitable template exists, for example.

SUMMARY OF THE INVENTION

An embodiment provides an image processing apparatus which lays out target image data pieces in a template suitable for the layout target image data pieces, a control method, and a record medium storing a program.

An aspect of the present invention provides an image processing apparatus including a first acquiring unit configured to acquire at least a first template group having a first number of image data layout regions and including a plurality of templates having different layouts from each other and a second template group having a second number of image data layout regions and including a plurality of templates having different layouts from each other, a second acquiring unit configured to acquire at least a first layout candidate information group including a plurality of layout candidate information pieces generated based on the first number of image data pieces and the plurality of templates included in the first template group and a second layout candidate information group including a plurality of layout candidate information pieces generated based on the second number of image data pieces and the plurality of templates included in the second template group, an evaluating unit configured to evaluate a plurality of layout candidate information pieces at least including the first layout candidate information group and the second layout candidate information group to provide an evaluation, a selecting unit configured to select a template corresponding to one layout candidate information piece of the plurality of layout candidate information pieces evaluated by the evaluating unit based on the evaluation provided by the evaluating unit, and an output unit configured to output a layout result based on the template selected by the selecting unit.

Further features of the present invention will become apparent from the following description of exemplary embodiments with reference to the attached drawings.

BRIEF DESCRIPTION OF THE DRAWINGS

FIG. 5 illustrates image analysis information.

FIG. 7 illustrates an average value for each scene and normal deviations.

FIGS. 8A and 8B illustrate a concept of a scoring axis.

FIGS. 9A to 9I are diagrams for explaining selections of image data pieces.

FIGS. 12A to 12D illustrate information for layout of image data pieces.

DESCRIPTION OF THE EMBODIMENTS

Embodiments will be described in detail with reference to the attached drawings. The following embodiments are not intended to limit the claimed invention, and all combinations of characteristics according to those embodiments are not necessary for implementation. Like numbers refer to like components throughout, and any repetitive description will be omitted.

First Embodiment

According to a first embodiment, an album creation application is operated on an image processing apparatus to generate a layout by using automatic layout function.

Figure 1:
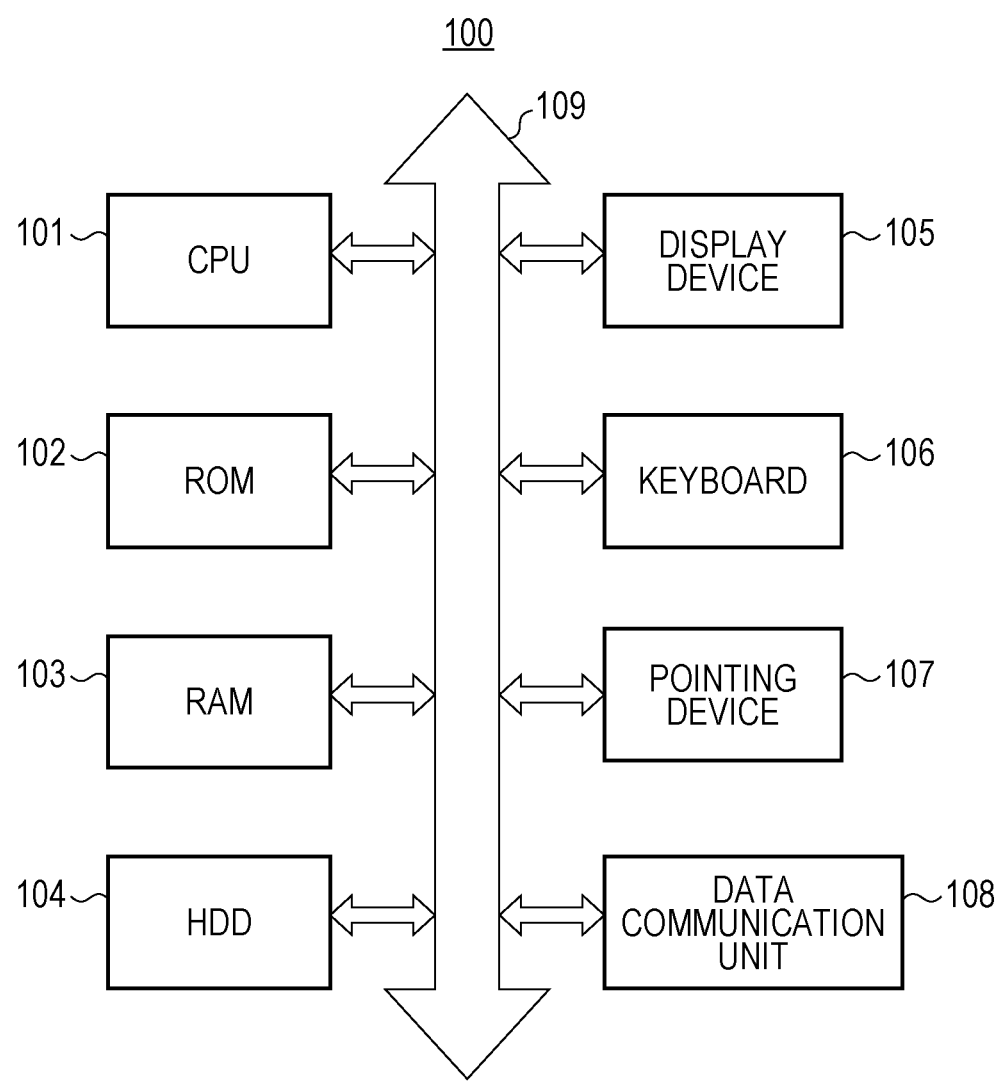
FIG. 1 is a block diagram illustrating a hardware configuration of an image processing apparatus.

FIG. 1 is a block diagram illustrating a hardware configuration of the image processing apparatus. The image processing apparatus may be a personal computer (PC), a smart phone, a tablet terminal, a camera, or a printer, for example. The following description of this embodiment assumes that the image processing apparatus is a PC. A CPU (central processing unit/processor) 101 generally controls an image processing apparatus 100, and a program stored in a ROM (read-only memory) 102 may be read out to and executed in a (random-access memory) RAM 103 to implement operations of this embodiment. Though FIG. 1 illustrates one CPU, a plurality of CPUs may be provided. The ROM 102 is a general-purpose ROM and may store a program to be executed by the CPU 101, for example. The RAM 103 is a general-purpose RAM and may be used as a working memory for temporarily storing information when a program is executed by the CPU 101, for example. An HDD (hard disk drive) 104 is a storage medium (storage unit) configured to store a database holding an image file and a processing result of an image analysis and a template to be used in the album creation application.

A display device 105 displays a user interface (UI) and a layout result of images to a user according to this embodiment. A keyboard 106 and a pointing device 107 receive an instruction operation from a user. The display device 105 may have a touch sensor function. The keyboard 106 may be used by a user for inputting a number of double-page spreads of an album to be generated on a user interface displayed on the display device 105, for example. The pointing device 107 may be used by a user for clicking a button on a user interface displayed on the display device 105, for example.

A data communication unit 108 is configured to communicate with an external apparatus via a wired or wireless network, for example. The data communication unit 108 may transmit data pieces laid out by an automatic layout function, for example, to a printer or a server capable of communicating with the image processing apparatus 100. A data bus 109 is configured to communicably connect blocks illustrated in FIG. 1 with each other.

The album creation application according to this embodiment is stored in the HDD 104 and is activated in response to a double click on an icon of the application displayed on the display device 105 by a user by using the pointing device 107 as will be described below.

Figure 2:
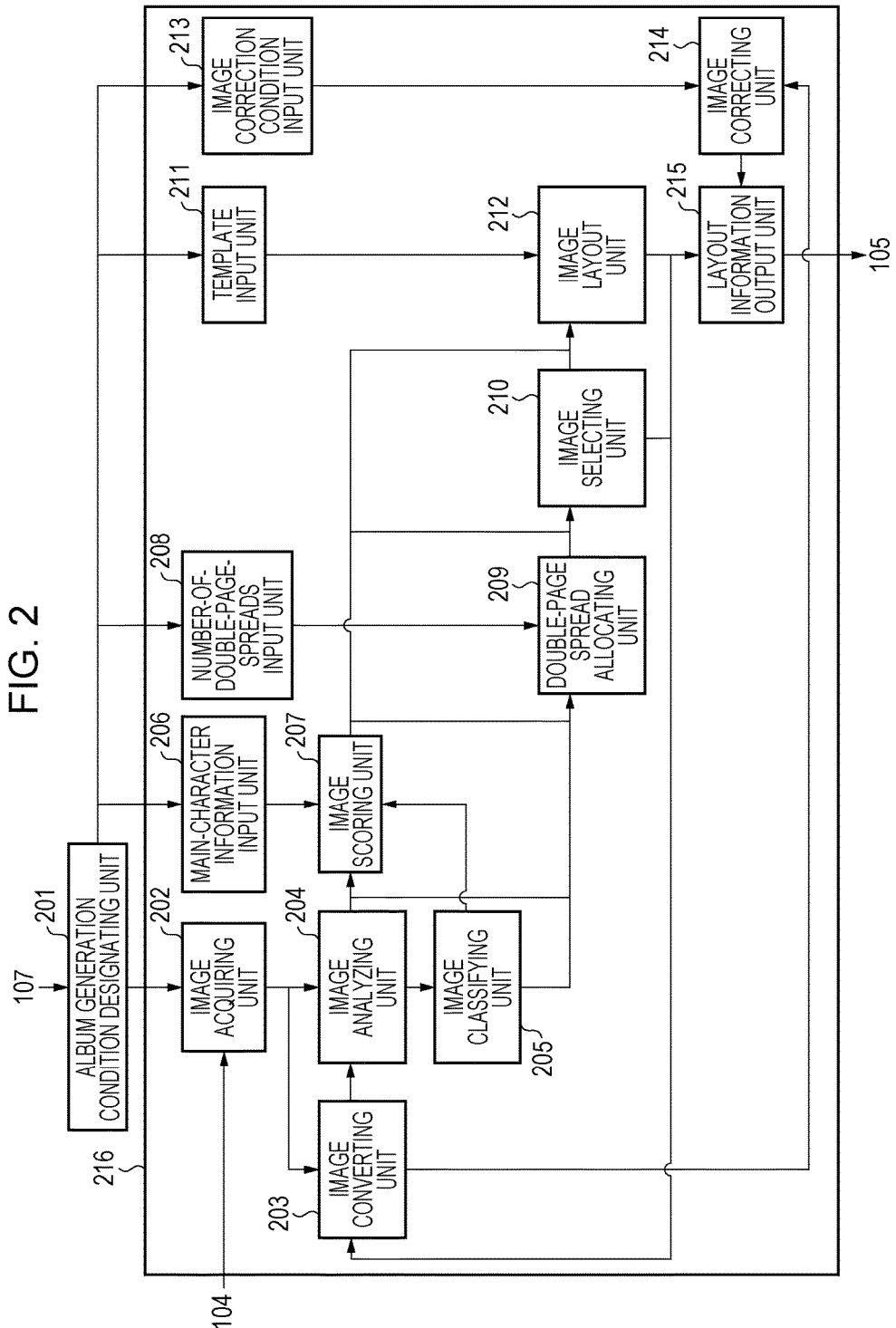
FIG. 2 is a software block diagram of an album creation application.

FIG. 2 is a software block diagram illustrating the album creation application. In particular, FIG. 2 illustrates a software block diagram relating to an automatic layout processing unit 216 configured to execute the automatic layout function. The automatic layout function is configured to lay out image data pieces acquired by classifying and selecting captured still images or moving images on basis of their contents and attributes in a template that is prepared in advance and display the layout result on the display device 105. An album generation condition designating unit 201 outputs an album generation condition according to a user interface operation performed by a user, which will be described below, by using the pointing device 107 to the automatic layout processing unit 216. Execution of the album creation application stored in the HDD 104 by the CPU 101 can cause the CPU 101 to function as the blocks illustrated in FIG. 2.

An image acquiring unit 202 is configured to acquire, from the HDD 104, an image data piece group designated from the album generation condition designating unit 201. An image converting unit 203 is configured to convert image data to be used for subsequent processing to a target number of pixels or color information. According to this embodiment, image data are converted to analyzed image data of the number of pixels with 420 pixels on the short side and sRGB (standard red, green, and blue) color information. An image analyzing unit 204 is configured to execute feature amount acquisition, face detection, facial expression recognition, and a personal recognition process, which will be described below, on analyzed image data. The image analyzing unit 204 may acquire data associated with the image data acquired from the HDD 104 and may further acquire the capturing date/time from Exif (exchangeable image file format) information, for example. An image classifying unit 205 is configured to execute a scene division process or a scene classification process, which will be described below, on an image data piece group by using capturing date/time information, a number of captured images, detected face information, and so on. Here, the term, "scene" refers to a captured scene such as "TRAVEL", "DAILY", "WEDDING CEREMONY". In other words, the term "scene" refers to a set of image data pieces captured in a capturing opportunity during one period, for example. An image scoring unit 207 scores high an image suitable for a layout for each image data piece. The image scoring unit 207 scores by using information from the image analyzing unit 204 and information from the image classifying unit 205, which will be described below.

A main-character information input unit 206 inputs, to the image scoring unit 207, an ID (identification information) of a main character input from the album generation condition designating unit 201. The image scoring unit 207 is configured to give a high score to an image data piece including a main character ID input from the main character information input unit 206.

A double-page spread allocating unit 209 is configured to divide image data pieces and allocates one of divided image data pieces to a double-page spread of an album. The number-of-double-page-spreads input unit 208 inputs the number of double-page spreads of an album input from the album generation condition designating unit 201 to the double-page spread allocating unit 209. The number of double-page spreads of an album corresponds to the number of a plurality of templates in which a plurality of images is laid out. The double-page spread allocating unit 209 is configured to divide image data pieces based on the input number of double-page spreads and allocates a part (division) of the image data pieces to a double-page spread. An image selecting unit 210 selects image data pieces for a number of slots in an image layout region, which are input by the album generation condition designating unit 201, from a part of the image data pieces allocated to a double-page spread by the double-page spread allocating unit 209 on basis of the score given by the image scoring unit 207.

An image layout unit 212 is configured to determine a layout of image data pieces. A template input unit 211 is configured to input, to the image layout unit 212, a plurality of templates based on template information input from the album generation condition designating unit 201. The image layout unit 212 may select a template suitable for image data pieces selected by the image selecting unit 210 from a plurality of templates input from the template input unit 211 and determine a layout of the image data pieces. A layout information output unit 215 is configured to output layout information for displaying on the display device 105 in accordance with the layout of image data pieces determined by the image layout unit 212. The layout information may be bitmap data acquired by laying out image data pieces selected by the image selecting unit 210 in a selected template, for example.

An image correcting unit 214 is configured to execute dodging correction (brightness correction), red-eye correction, and contrast correction. An image correction condition input unit 213 is configured to input, to the image correcting unit 214, an ON/OFF state for an image correction input from the album generation condition designating unit 201. An image correcting unit 214 is configured to execute a correction on image data if the image correction condition is ON and does not execute a correct if the image correction condition is OFF. The image correcting unit 214 executes a correction in accordance with the ON/OFF state of a correction to be performed on image data input from the image converting unit 203. The number of pixels of image data input from the image converting unit 203 to the image correcting unit 214 is changeable in accordance with the size of the layout determined by the image layout unit 212.

When the album creation application is installed in the image processing apparatus 100, an activation icon corresponding thereto is displayed on a top screen (desktop) of an operating system (OS) running on the image processing apparatus 100. When a user double-clicks the activation icon on a desktop displayed on the display device 105 by using the pointing device 107, a program of the album creation application stored in the HDD 104 is loaded to the ROM

102. When the program in the ROM 102 is read to the RAM 103 and executed by the CPU 101, the album creation application is activated.

Figure 3:
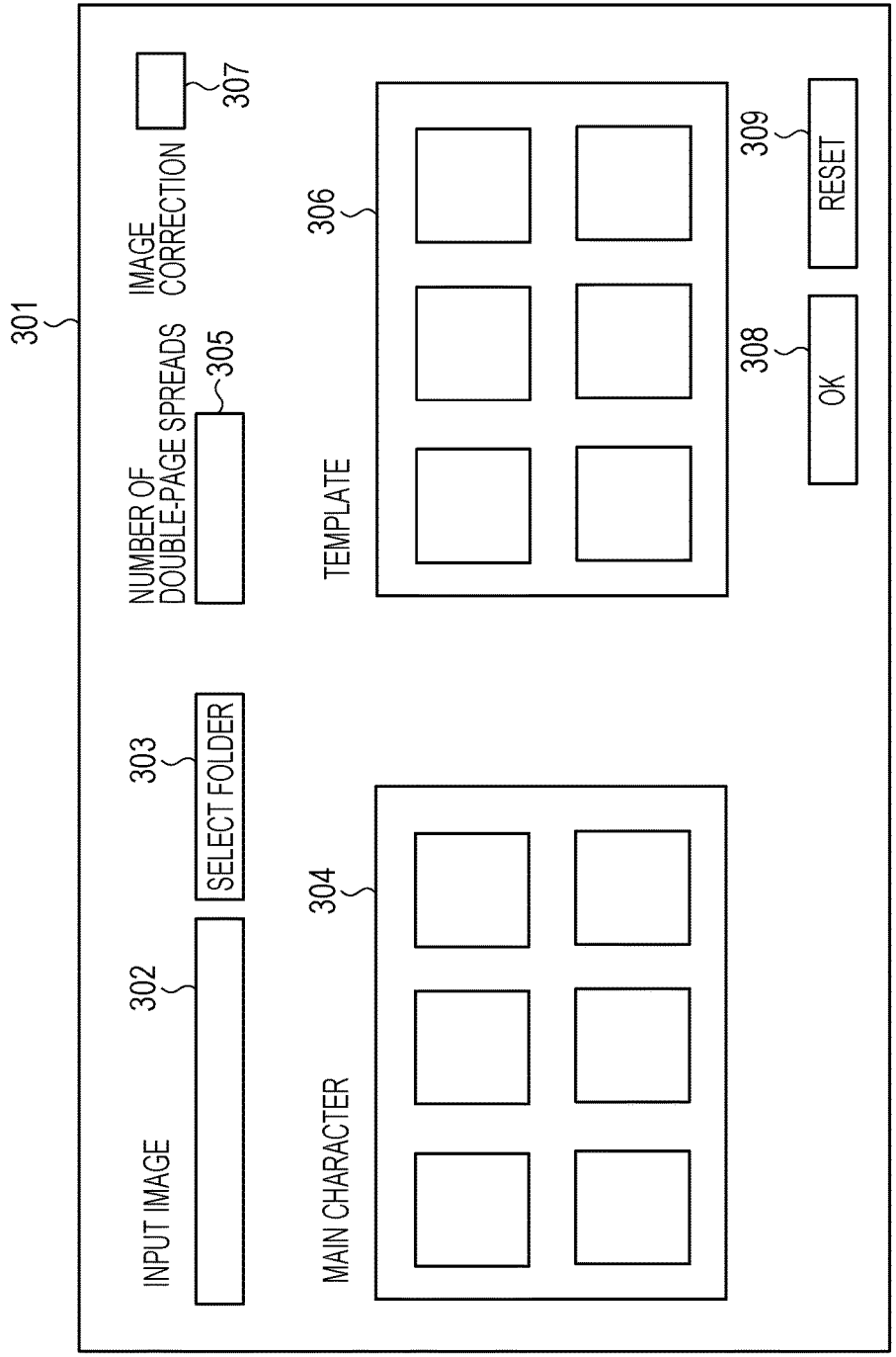
FIG. 3 illustrates a display screen provided by the album creation application.

FIG. 3 illustrates an example display screen 301 provided by the album creation application. The display screen 301 is displayed on the display device 105. A user may set an album generation condition, which will be described below, through the display screen 301, and the album generation condition designating unit 201 acquires settings from the user.

The display screen 301 shows a path box 302 for displaying a storage location (path) in the HDD 104 of an image data piece group with which an album is generated. A folder selection button 303 displays folders including image data piece groups with which an album can be generated in a tree structure so that a user can perform a click operation on a folder by using the pointing device 107 to select the image data piece group. A path to the folder including the image data piece groups selected by the user is displayed in the path box 302.

Main-character designation icons 304 are icons usable by a user for designating a main character and display facial images of people. The main-character designation icons 304 display aligned icons of a plurality of different facial images, and a user can click one of them by using the pointing device 107. Each of the facial images is associated with a personal ID. The main-character designation icons 304 are usable for identifying a main character that is a central figure from people shown in images represented by analysis target image data. Such a facial image may be detected from image data in advance, for example, and is registered with a face database in association with its personal ID. The main-character designation icons 304 may display facial images of a person selected by a user and facial images of a person determined by a method, which will be described below, among facial images of people registered with the face database, for example. The main character is automatically set in the procedure illustrated in FIG. 4.

A number-of-double-page-spreads box 305 receives a setting for the number of double-page spreads for an album from a user. A user may input a number directly to the number-of-double-page-spreads box 305 through the keyboard 106 or may select a number from a list to input to the number-of-double-page-spreads box 305 by using the pointing device 107.

The template designation icons 306 display illustration images in different template styles (such as a pop style and a chic style). The template designation icons 306 display a plurality of template icons so that a user can click to select one of them by using the pointing device 107. A check box 307 is usable for receiving a designation of an ON/OFF state of an image correction from a user. When it is checked, image correction processing is designated as ON. When it is not checked, image correction processing is designated as OFF.

When a user presses an OK button 308, the album generation condition designating unit 201 acquires settings on the display screen 301. The album generation condition designating unit 201 outputs the acquired settings to the automatic layout processing unit 216 of the album creation application. The path input to the path box 302 then is informed to the image acquiring unit 202. The personal ID of the main character selected in the main-character designation icons 304 is informed to the main character information input unit 206. The number of double-page spreads input to the number-of-double-page-spreads box 305 is informed to the number-of-double-page-spreads input unit 208. The template information selected in the template designation icons 306 is informed to the template input unit 211. The designated ON/OFF state of the image correction processing in the image correction check box 307 is informed to the image correction condition input unit 213. A reset button 309 on the display screen 301 is a button for resetting such setting information on the display screen 301.

Figure 4:
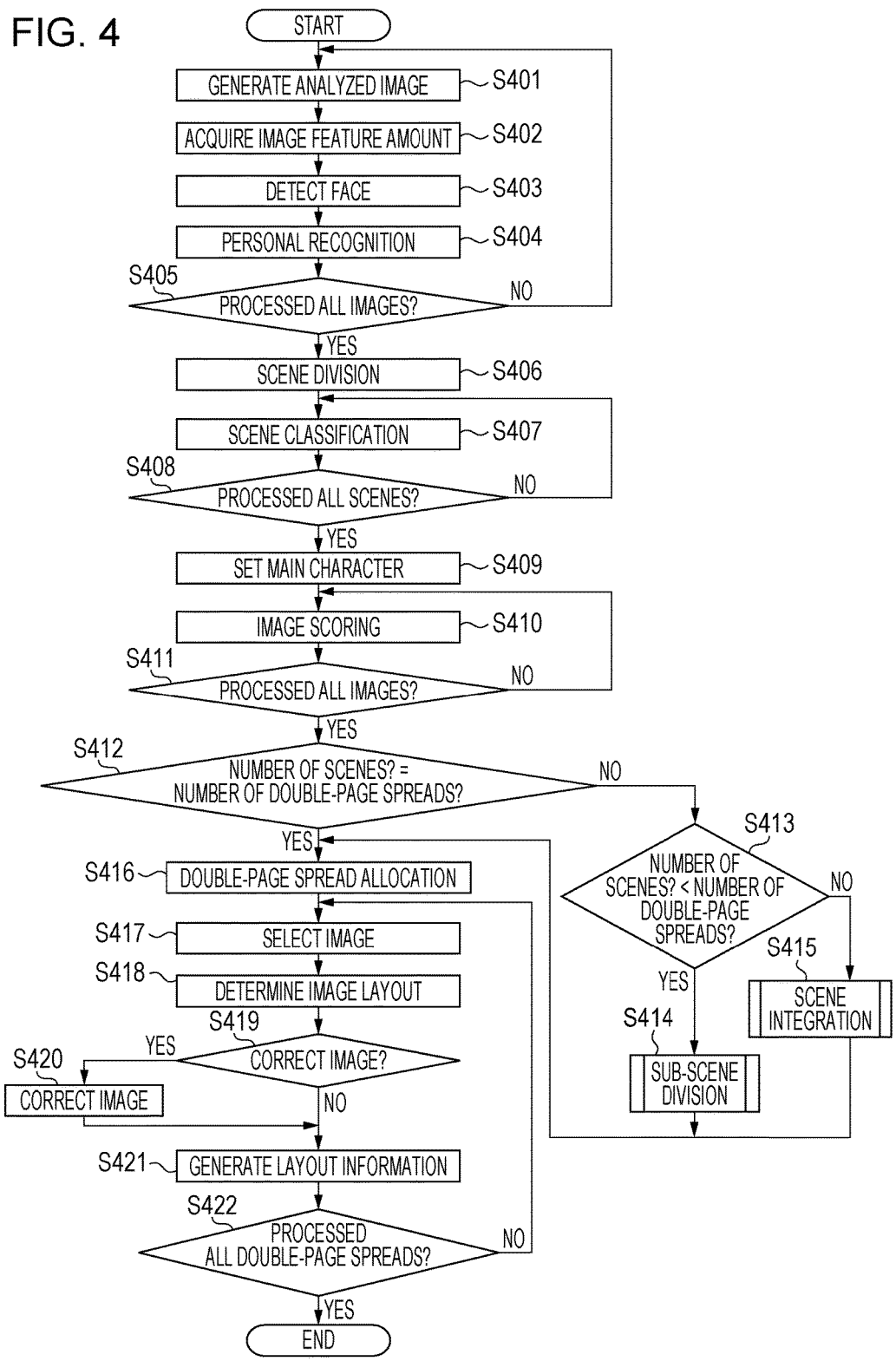
FIG. 4 is a flowchart illustrating automatic layout processing.

FIG. 4 is a flowchart illustrating processing to be performed by the automatic layout processing unit 216 of the album creation application. The flowchart illustrated in FIG. 4 may be implemented by a program stored in the HDD 104, read to the ROM 102 or the RAM 103 and executed by the CPU 101, for example. The automatic layout processing will be described with reference to FIG. 4.

In S401, the CPU 101 analyzes image data acquired by the image acquiring unit 202 by using the image converting unit 203 and generates the analyzed image data. More specifically, the CPU 101 uses the image converting unit 203 to convert image data pieces of an image data piece group in the HDD 104, which is designated by the album generation condition designating unit 201, to analyzed image data of a target number of pixels and color information. According to this embodiment, the image data is converted to analyzed image data of 420 pixels on the short side and sRGB color information. The image data acquired by the image acquiring unit 202 is data corresponding to a still image and a moving image acquired by the CPU 101 by using the image acquiring unit 202 from a folder, a server, or an SNS designated at the path box 302.

In S402, the CPU 101 acquires a feature amount from the analyzed image data (image data acquired and analyzed in S401) by using the image analyzing unit 204. For example, the CPU 101 acquires capturing date/time from Exif information associated with image data pieces acquired from the HDD 104. The feature amount may be a focus, for example. Sobel filter is generally known as a method for detecting an edge for acquiring a focus feature amount. The CPU 101 detects an edge by Sobel filter and calculates a tilt of the edge by dividing a brightness difference between a starting point and an end point of the edge by a distance between the starting point and the end point. From a result of calculation of an average tilt of edges in the image, if the average tilt is large, the image may be regarded as being in focus compared to an image having a small average tilt. A plurality of different threshold values may be set for a tilt, and which threshold value is to be applied is determined so that an evaluation value for the focus amount can be output. According to this embodiment, two different threshold values may be preset, and a focus amount may be determined based on three levels of "YES", "ACCEPTABLE", and "NO". Those threshold values may be preset through experiments such that a focus tilt level to be adopted for an album can be represented by "YES", an acceptable focus tilt level can be represented by "ACCEPTABLE", and a focus tilt level that is not acceptable can be represented by "NO". The threshold values may be set by a manufacturer of the album creation application or may be set on a user interface, for example.

In S403, the CPU 101 executes face detection on the analyzed image data generated in S401 by using the image analyzing unit 204. Here, the face detection processing may apply Adaboost (adaptive boosting) which generate a strong discriminator from a plurality of weak discriminators, for example, by using a publicly known method. According to this embodiment, a facial image of a person (object) is detected based on the strong discriminator generated by Adaboost. The CPU 101 extracts the facial image and acquires the upper left coordinate value and lower right coordinate value of a position of the detected facial image. From the two coordinate values, the CPU 101 can acquire the position of the facial image and the size of the facial image. A strong discriminator may be generated by Adaboost by defining an object such as an animal such as a dog and a cat, flower, food, a building, and an ornament, without limiting to a face, as a detection target instead of a face. Thus, the CPU 101 can detect an object image other than a facial image.

In S404, the CPU 101 performs personal recognition by using the image analyzing unit 204. More specifically, the CPU 101 compares in similarity degree the facial image detected in S403 and a representative facial image stored for each personal ID in a face dictionary database for personal recognition. The CPU 101 determines the similarity degree between each representative facial image and the extracted facial image and determines the ID of the representative facial image with the highest similarity degree of those with similarity degrees equal to or higher than a threshold value as the ID of the detected facial image. If the similarity degree with all representative facial images stored in the face dictionary database is lower than the threshold value, the CPU 101 registers the extracted facial image as a new personal ID with the face dictionary database.

The CPU 101 stores the image analysis information acquired in S402 to S404 in a storage region in the ROM 103, for example, under the corresponding ID by which an image can be identified, as illustrated in FIG. 5. For example, as illustrated in FIG. 5, the capturing date/time information and focus identification result acquired in S402 and the number and position information of facial images detected in S403 are stored in a table format. The position information of a facial image is stored under the corresponding personal ID acquired in S404.

In S405, the CPU 101 determines whether the processing in S401 to S404 has completed on all image data pieces of the image data piece group, which is designated by the album generation condition designating unit 201, in the HDD 104 or not. Here, if it is determined that the processing has not completed, the CPU 101 repeats the processing from S401. If it is determined that the processing has completed, the processing moves to S406.

Figure 6A:
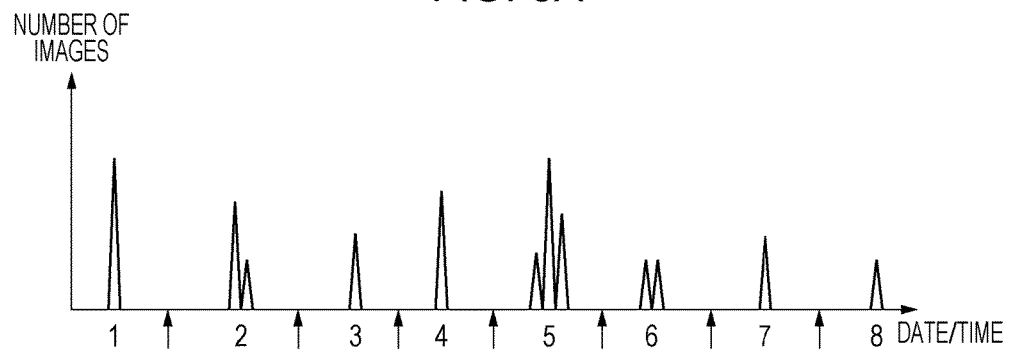
FIGS. 6A to 6C illustrate results of a scene division of an image data pieces.
Figure 6B:
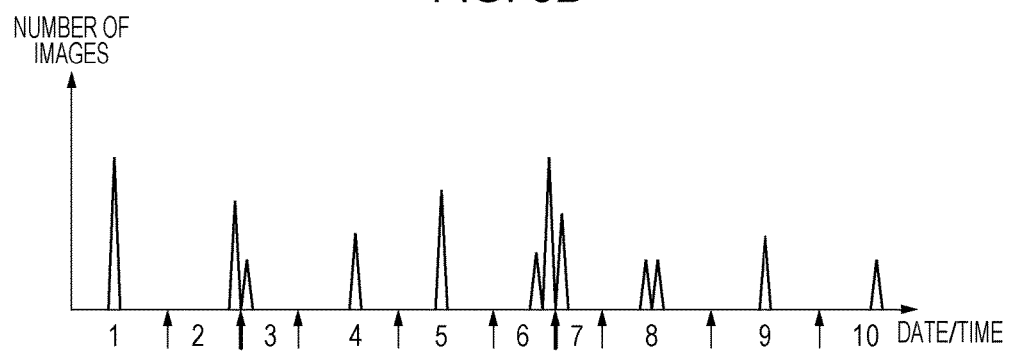
Figure 6C:
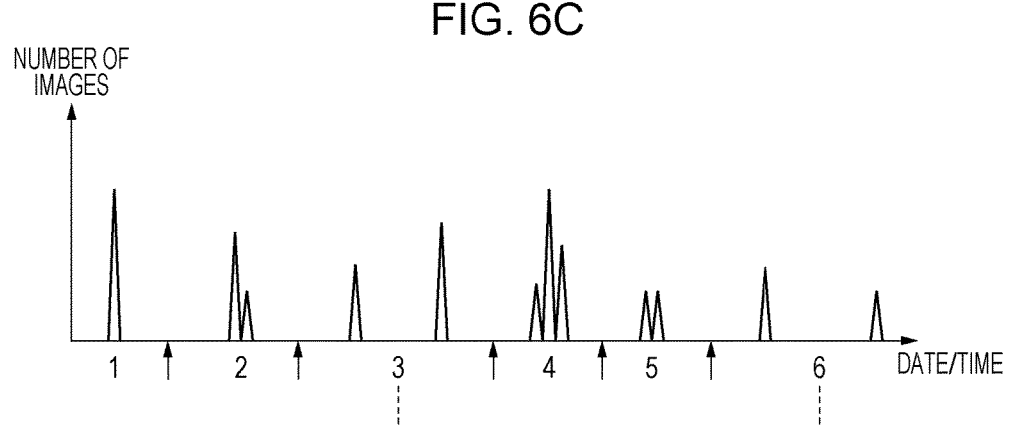

In S406, the CPU 101 executes scene division by using the image classifying unit 205. The scene division includes dividing all images of an image group designated by the album condition designating unit 201 based on scenes and managing the divided images as a plurality of image groups. More specifically, the CPU 101 divides image data pieces into a plurality of scenes on basis of a time difference between images calculated from the capturing date/time information acquired in S402. According to this embodiment, in a case where there is a day when no capturing is performed between image data pieces, for example, the division is performed with reference to the part. The division may be performed with reference to another part. For example, the division may be performed with reference to a part where the time difference is equal to or longer than 16 hours in a case where capturing dates are successive. If the time difference is shorter than 16 hours and if the time difference from the first capturing to the last capturing of each of successive days is shorter than 4 hours, the division is performed. If the time difference is equal to or longer than 4 hours and if the number of captured images of each of the successive days is lower than 50 images, the division is performed. If not, the division is not performed. FIG. 6A illustrates an example result of a scene division of image data pieces according to the scene division method as described above. FIGS. 6A to 6C illustrate numbers each indicating divided image group number.

In S407, the CPU 101 executes the scene classification by using the image classifying unit 205. More specifically, the CPU 101 scores divided image groups as a result of the scene division in S406 for each type of scene and classifies each of the divided image groups to a scene with the highest score. Hereinafter, the scoring in S407 will be called scene classification scoring. According to this embodiment, the image classifying unit 205 classifies image data for a division as a result of the scene division into one of "TRAVEL", "DAILY", "CEREMONY", for example. Before the automatic layout processing in FIG. 4 is started, a user may gather and classify a plurality of image data pieces into "TRAVEL", "DAILY", and "CEREMONY" scenes to generate a scene classification table. The scene classification table is a table storing information on a feature amount corresponding to a type of scene and is used for the scene classification scoring.

A method for generating the scene classification table by a user will be described below.

First, the CPU 101 receives designation of a plurality of image data pieces determined as can be classified into "TRAVEL" scene by a user through a user interface screen, not illustrated, by using the album generation condition designating unit 201. The CPU 101 then acquires a feature amount of each of the image data pieces by using the image analyzing unit 204. Here, the acquired feature amount may be a capturing period, a number of captured images, or a captured number of people, for example. The capturing period is a time difference from the first capturing to the last capturing of a plurality of image data pieces. The number of captured images is the number of captured images of a plurality of image data pieces. The number of captured people refers to the number of captured faces. As a result, feature amounts of the capturing period, the number of captured images, and the number of captured people are acquired for one image data piece group including a plurality of image data pieces determined as corresponding to a travel scene by a user. The feature amounts are not limited to those of the capturing period, number of captured images, and number of captured people, but other feature amounts may be used or one of them may be used.

The CPU 101 then acquires the feature amounts of the capturing period, the number of captured images, and the number of captured people as described above for another image data piece group designated by a user. The CPU 101 acquires an average value and a normal deviation of the capturing period, an average value and a normal deviation of the number of captured images and an average value and a normal deviation of the number of captured people on basis of the feature amounts acquired from a plurality of image data piece groups. The thus acquired values are associated with the types of scenes so that a scene classification table can be generated which shows average values and normal deviations of the types of scene. According to this embodiment, the scene classification table may be a table 700 illustrated in FIG. 7. The table 700 shows the thus acquired average values and normal deviations, and the CPU 101 stores in advance these values in a storage region in the ROM 102, for example. The table 700 may be incorporated in advance in the program of the album creation application program or may be incorporated in another program of an application excluding the album creation application.

The scene classification scoring will be described below. After the album creation application is activated, the image classifying unit 205 calculates a score for each of the capturing period, number of captured images, number of captured people feature amounts for each division acquired by scene dividing the image data piece group designated at the path box 302 by a user in S406. The image classifying unit 205 calculates scores and the average scores for the capturing period, number of captured images, number of captured people of divisions by using the average value and the normal deviation for each scene in FIG. 7 and Expressions (1) and (2). An average value of a predetermined feature amount corresponding to a predetermined type of scene and a normal deviation of a predetermined feature amount corresponding to a predetermined type of scene in Expressions (1) and (2) are included in the table 700.

Score for a predetermined feature amount corresponding to a predetermined type of scene of a divided image data piece group=50−|10×(average value of the predetermined feature amount corresponding to the predetermined type of scene−the predetermined feature amount of the divided image data piece group)/normal deviation of the predetermined feature amount corresponding to the predetermined type of scene|   (1)

Score regarding a predetermined feature amount corresponding to as predetermined type of scene of a divided image data piece group=(a score for a capturing period corresponding to the predetermined type of scene+a score for a number of captured images+a score for a number of captured people of the divided image data piece group)/the number of feature amount items   (2)

In this case, the feature amounts are capturing period, number of captured images, and number of captured people feature amounts. Thus, the number of feature amount items is equal to 3 in this example.

First of all, the CPU 101 acquires a score for each type and feature amount of a scene of a divided image data piece group by using Expression (1).

Thus, scores for the capturing period, number of captured images, and number of captured people corresponding to the "TRAVEL" scene, for example, in the divided image data piece group are acquired. In this case, the CPU 101 acquires not only scores for "TRAVEL" scene but also for other types of scene.

Next, the CPU 101 uses Expression (2) to average the scores acquired by using Expression (1) and acquires a score regarding the types of scene of the divided image data piece group.

Thus, scores regarding the types of scene of "TRAVEL", "DAILY", and "CEREMONY" in the divided image data piece group, for example, are acquired. The CPU 101 performs the scene classification scoring for each divided image data piece group.

The score for each of scenes "TRAVEL", "DAILY", and "CEREMONY" is calculated for image data of each of the divisions. The CPU 101 classifies the divided image data piece groups into a scene corresponding to the highest score among those scenes. If there are scenes with equal scores, the divided image data piece group is classified based on predetermined priority levels of the scenes. For example, according to this embodiment, priority levels are predetermined in order of DAILY>CEREMONY>TRAVEL, and the DAILY scene has the highest priority level.

It is assumed here, for example, that a divided image data piece group 5 corresponding to a Scene 5 having undergone the scene division as illustrated in FIG. 6A has 36 capturing periods, 300 captured images, and 1.7 captured people. Then, in the divided image data piece group 5, the score for the travel scene is 45.32, the score for the daily scene is 18.38, and the score for the ceremony scene is −29.92. Therefore, the image data pieces 5 are classified into the travel scene. The CPU 101 manages classified scenes by giving a scene ID to each of the classified scenes such that a scene to which a divided image data piece group is classified can be identified.

Having described feature amounts for the scene classification with focus on the capturing period, the number of captured images, and the number of captured people, an embodiment is not limited thereto. The accuracy of the classification may be increased by adding feature amounts such as image brightness and the numbers of people and images. It is not intended that the types of scene are limited to "TRAVEL", "DAILY", and "CEREMONY", but other scenes such as party and sport may be applied. In order to perform scene classification involving other scenes, a plurality of image data piece groups of the other scenes may be gathered, and average values and normal deviations of the feature amounts for the scene classification may be acquired for generating the table 700.

In S408, whether the scene classification in S407 has completed on all of the divided image data piece group groups acquired in S406 (divided image data piece groups corresponding to the scenes acquired as illustrated in FIG. 6A herein) or not is determined. If not, the CPU 101 repeats the processing from S407 with focus on a divided image data piece group not having undergone the processing. If so, the CPU 101 advances the processing to S409.

In S409, the CPU 101 sets a main character by using the image scoring unit 207. The main character setting may be performed on an image data piece group designated by a user either automatically or manually. The CPU 101 can acquire the number of times of appearance of each personal ID in the image data piece group, the number of times of appearance of each personal ID in each of scenes, the number of scenes in which each personal ID appears from the result of the personal recognition executed in S404 and the result of the scene division executed in S406. The image scoring unit 207 sets a main character automatically and independently from a user designation from those kinds of information. According to this embodiment, the CPU 101 sets a personal ID with a highest number of times of appearance in a plurality of scenes in a case where an image data piece group designated by a user is divided into a plurality of divided image data piece group by scene as a main character ID. The CPU 101 sets a personal ID with a high number of times of appearance in a single scene in a case where the designated image data piece group belongs to a single scene as a main character ID.

The CPU 101 informs the image scoring unit 207 of the personal ID designated through the main character information input unit 206 in a case where one of the main-character designation icons 304 is designated by a user. In a case where a personal ID is designated by a user, the CPU 101 sets the personal ID designated by the user as a main character ID independently from the main character ID automatically set as described above. This setting operation will be called a manual setting.

Figure 10:
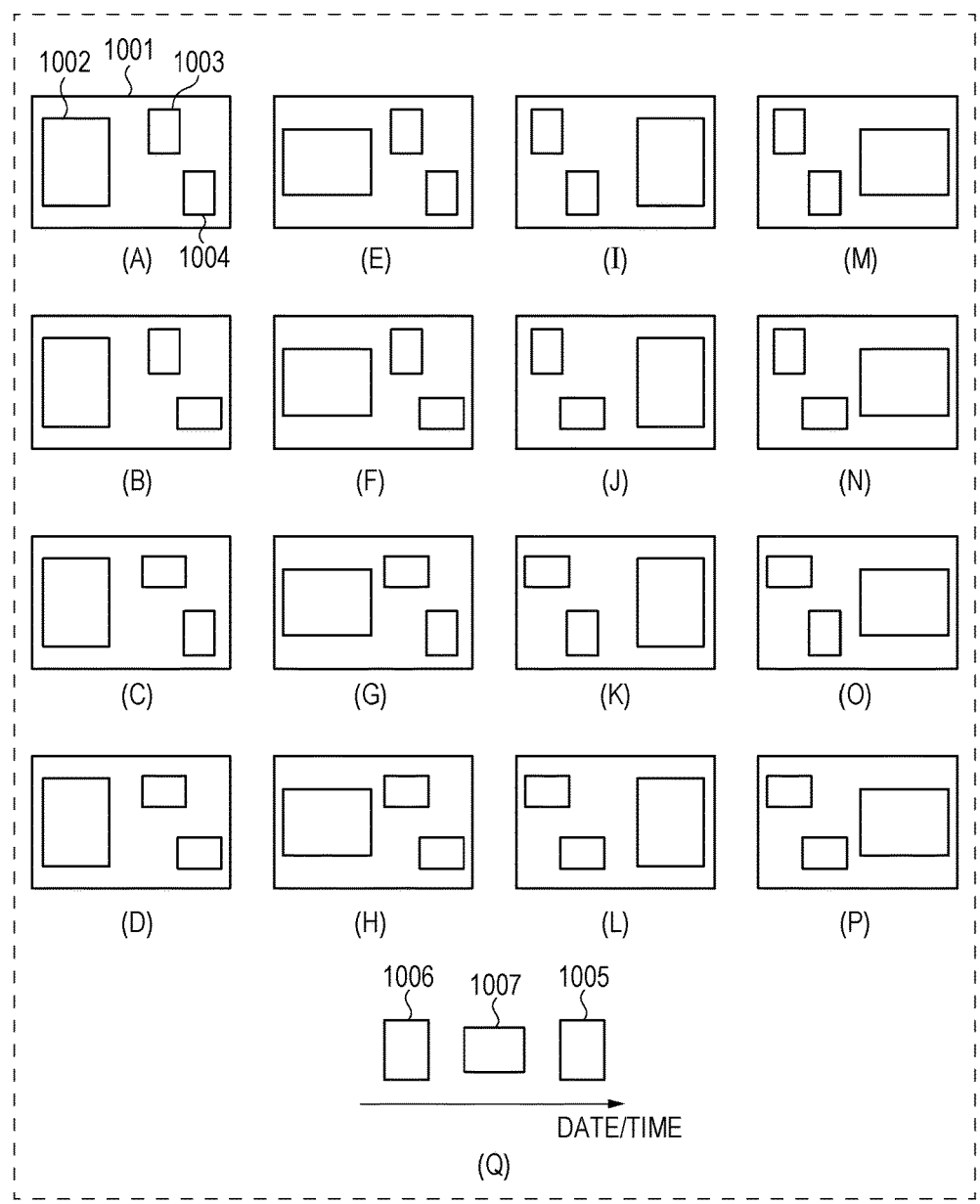
FIG. 10 illustrates a template group usable for layout of image data pieces.

In S410, the CPU 101 executes image scoring by using the image scoring unit 207. The image scoring includes giving a score for (or scoring) an evaluation from a viewpoint, which will be described below, for each image data piece, and the score is referred when an image data piece to be used in a layout is selected, which will be described below. FIG. 10 illustrate a template group to be used for laying out image data pieces. A plurality of templates included in the template group correspond to respective double-page spreads. A template 1001 represents one template, and a main slot 1002 represents a main slot. Sub-slots 1003 and 1004 represent sub-slots. The main slot 1002 is a main slot (or a frame in which an image is laid out) within the template 1001 and has a larger size than those of the sub-slots 1003 and 1004. In one template, image data pieces classified to an identical type of scene are laid out. In S410, the CPU 101 performs image scoring from a viewpoint that a selected image data piece is suitable for a slot in a template or not. The CPU 101 gives both of a score for a main slot and a score for a sub-slot to each image data piece. The image scoring uses a slot feature table storing information regarding feature amounts of images to be laid out in a main slot and a sub-slot corresponding to a type of scene. In one template, image data pieces classified to a plurality of types of scene may be laid out.

FIG. 8A illustrates features of image data pieces to be laid out in a main slot and a sub-slot corresponding to types of scene including "TRAVEL", "DAILY", and "CEREMONY".

Before the automatic layout processing in FIG. 4 is started, a user may gather and classify a plurality of image data pieces determined as being suitable to the features as illustrated in FIG. 8A to generate a slot feature table.

A method for generating the slot feature table by a user will be described below.

First, the CPU 101 receives a designation of a plurality of image data pieces determined as an image data piece to be laid out in a main slot (or a sub-slot) of a travel scene by a user through a user interface screen, not illustrated, by using the album generation condition designating unit 201. In other words, the CPU 101 receives from a user a designation of an image data piece fitted to a feature as illustrated in FIG. 8A. Next, the CPU 101 acquires the number of facial images, the positions of the facial images and feature amounts in size of the facial images of each designated image data piece by using the image analyzing unit 204. As a result, the CPU 101 acquires the number of facial images, the positions of the facial images and the feature amounts in size of the facial images in each of a plurality of image data pieces determined as image data piece to be laid out in a main slot (or a sub-slot) of a travel scene by a user. The CPU 101 acquires the average value and normal deviation of the numbers of the faces, the average value and normal deviation of the positions of the face, and the average value and normal deviation of the face sizes. These average values and normal deviations of the feature amounts may be acquired for each scene type and for each slot type (main slot and sub-slot) to generate a slot feature table. The CPU 101 may prestore the slot feature table in the ROM 102, for example. The slot feature table may be incorporated in advance in the program of the album creation application program or may be incorporated in another program of an application excluding the album creation application.

In the image scoring, the CPU 101 scores an image data piece for each slot of a template corresponding to a type of scene to which the image data piece belongs by using Expression (3).

Score regarding a predetermined feature amount corresponding to a predetermined slot of an image data piece=50−|10×(average value of the predetermined feature amount corresponding to the type of scene to which the image data belongs− the predetermined feature amount of the image data piece)/normal deviation of the predetermined feature amount corresponding to the type of scene to which the image data piece belongs and the predetermined slot| (3)

The CPU 101 can acquire the type of scene to which an image data piece belongs from a result of the scene classification in S407. The average value of a predetermined feature amount corresponding to a predetermined type of scene and a predetermined slot and the normal deviation of a predetermined feature amount corresponding to a predetermined type of scene and a predetermined slot in Expression (3) are stored in the slot feature table. The feature amounts are the number of facial images, the positions of facial images and the sizes of the facial images of a main character ID. Thus, the number of feature amount items is equal to 3 in this example.

Thus, the score for "the number of faces of the main character ID" corresponding to the main slot corresponding to the "TRAVEL" scene of the image data piece classified into the "TRAVEL" scene, for example, can be acquired. The CPU 101 may acquire scores for feature amounts corresponding to not only a main slot but also a sub-slot. The CPU 101 may acquire scores for feature amounts corresponding to "the number of faces of the main character ID" but also "the positions of the facial images" and "the sizes of the facial images".

Next, the CPU 101 uses Expression (4) to average the scores acquired by using Expression (3) and acquires a score regarding a predetermined slot of an image data piece.

Score regarding a predetermined slot of an image data piece=(a score for the number of faces corresponding to a type of scene to which the image data piece belongs and a predetermined slot+a score for the positions of the faces and the score for the sizes of the faces)/the number of feature amount items (4)

Thus, the CPU 101 executes scoring regarding both of the main slot and the sub-slots for an image data piece. The CPU 101 performs the image scoring on each of image data pieces in the image data piece group designated by a user. Because it is preferred that an image to be used in an album be in focus, a predetermined point may be added to the score for an image data piece with an image ID having a focus feature amount "YES" as illustrated in FIG. 5. FIG. 8B illustrates example score results of the scoring. The table illustrated in FIG. 8B shows results of scoring for a main slot and a sub-slot with respect to image IDs.

In other words, according to this embodiment, conditions suitable for a main slot and a sub-slot are defined for each scene as illustrated in FIG. 8A, and a user may designate in advance an image data piece determined as meeting the conditions. The image analyzing unit 204 acquires feature amounts of the number of faces, face positions, and face sizes from an image data piece designated by the user and acquires in advance the average value and normal deviation for each of the feature amounts. After the album creation application is activated and the automatic layout processing in FIG. 4 is started, scoring is performed on each (scene classified) image data piece subject to the automatic layout processing to indicate how close (or similar) the image data piece is to a user determination reference such as how much the image data piece is suitable for a main slot. For example, referring to FIG. 8B, an image ID 1 is given 20 points for a main slot, and an image ID 2 is given 45 points for the main slot. This means that the image ID 2 is closer to the user determination reference for the main slot.

FIG. 4 is referred back.

In S411, the CPU 101 determines whether the layout scoring on all image data pieces of the image data piece group designated by a user has finished or not is determined by the image scoring unit 207. If not, the CPU 101 repeats the processing from S410 with focus of the next unprocessed image. If so, the CPU 101 advances the processing to S412.

According to this embodiment, the CPU 101 lays out image data pieces included in a plurality of scenes to a plurality of templates (a plurality of double-page spreads) corresponding to the plurality of scenes by using the image layout unit 212. For that, the number of the plurality of scenes and the number of the plurality of templates (predetermined number of double-page spreads) must be matched.

Accordingly, in S412, the CPU 101 uses the double-page spread allocating unit 209 to determine whether the number of divisions in the scene division in S406 is equal to the number of double-page spreads of the album input from the number-of-double-page-spreads input unit 208 or not. If not, the CPU 101 advances the processing to S413. If so, the CPU 101 advances the processing to S416. For example, the CPU 101 advances the processing to S416 if the number of scene divisions is equal to 8 as illustrated in FIG. 6A and if the number-of-double-page-spreads input unit 208 inputs a number of 8.

In S413, the CPU 101 uses the double-page spread allocating unit 209 to determine whether the number of divisions in the scene division in S406 is lower than the number of double-page spreads (the number of templates to be used in the album) input from the number-of-double-page-spreads input unit 208 or not. If not (or higher), the CPU 101 advances the processing to S415. If so, the CPU 101 advances the processing to S414. For example, the CPU 101 advances the processing to S414 if the number of scene divisions is equal to 8 as illustrated in FIG. 6A and if the number-of-double-page-spreads input unit 208 inputs a number of 10.

In S414, the CPU 101 executes sub-scene division by using the double-page spread allocating unit 209. The sub-scene division includes sub-dividing a divided scene in a case where a relationship of the number of scene divisions <the number of double-page spreads of an album is satisfied. A case will be described below in which the number of scene divisions is equal to 8 as illustrated in FIG. 6A and the number of double-page spreads of an album designated for that is equal to 10. FIG. 6B illustrates results of the sub-scene division on the image data in FIG. 6A. Here, the division is set to be performed at shorter intervals, and the image data is divided at positions indicated by thick arrows so that the number of divisions can be equal to 10.

A reference for the division will be described. During the division processing as illustrated in FIG. 6A, a division position where there are many image data pieces is searched. It is assumed here that two positions where there are two image data pieces are determined to increase the number of divisions by two from 8 to 10. In other words, a scene to be re-divided is designated in order from a scene corresponding to a divided image data piece group including the highest number of image data pieces. Between scenes corresponding to divided image data piece groups including an equal number of image data pieces, one with a higher maximum value of a difference between capturing dates or times between image data pieces included in the corresponding divided image data piece group is selected. In a case where it is possible to select one of the divided image data piece groups even so, a scene corresponding to the divided image data piece group including an image data piece generated at an earlier time, for example, may be re-divided by priority.

Referring to FIG. 6A, scenes with higher numbers of image data pieces included in the corresponding divided image data piece groups are Scene 5, Scene 1, and Scene 2 in decreasing order. Though Scenes 1 and 2 have an equal number of data pieces, Scene 2 is to be divided because the time difference between the image data piece generated first and the image data piece generated at last in the corresponding divided image data piece group. Therefore, in FIG. 6A, each of Scene 5 and Scene 2 is divided.

First, division to be performed on Scene 2 will be described. Scene 2 has two concave-down portions of image data, and the image data pieces included in the two concave-down portions are captured at different dates between the concave-down portions. Therefore, Scene 2 is divided at positions indicated by the thick arrows in FIG. 6B corresponding to the part where the capturing date is changed. Next, division to be performed on Scene 5 will be described. Scene 5 have three concave-down portions of image data, and image data pieces included in the three concave-down portions are captured at different dates among the concave-down portion, like Scene 2. Though Scene 5 has two positions where the capturing dates are changed, the image data pieces are divided based on the capturing dates such that the difference in number of data pieces after the division can be small. Therefore, the image data pieces are divided at positions indicated by the thick arrows in FIG. 6B. Through the processing above, the number of divisions or the number of scenes is changed from 8 to 10. More specifically, a scene is re-divided such that image data pieces captured at different dates can belong to new scenes if the selected scene includes image data pieces captured at different dates. If given image data pieces are captured in three or more capturing dates, the difference in number of image data pieces included in the divided scenes is the smallest, and the image data pieces are divided such that the images captured at an identical date can be included in an identical scene. Having described the example in which image data pieces are divided at positions where the corresponding image data pieces are captured at different dates, image data pieces in a division target scene captured at one single day are divided at a position where a time difference between capturing times can be the largest during the single day. Having described the division at a position where the capturing date is changed, image data having many image data pieces during a single day may be divided at a position where the time difference between the capturing times thereof is the largest during the single day. Through this procedure, the number of scenes can be matched to the number of double-page spreads. A scene generated by the division may be classified again or may take over the classification of the scene before the division.

In S415, the CPU 101 executes scene integration by using the double-page spread allocating unit 209. The scene integration includes integrating divided scenes in a case where a relationship of the number of scene divisions >the number of double-page spreads of an album is satisfied. An example will be described in which the number of scene divisions is equal to 8 and the designated number of double-page spreads is equal to 6 as illustrated in FIG. 6A. FIG. 6C illustrates a result of the scene integration performed on the image data illustrated in FIG. 6A. The scenes before and after positions indicated by the broken lines are integrated so that the number of divisions can be equal to 6.

A reference for the integration will be described. First, the CPU 101 detects a scene having a lower number of image data pieces among divided scenes. It is assumed here that two scenes having a lower number of image data pieces are detected to reduce the number of scenes from 8 to 6. Referring to FIG. 6A, scenes having higher numbers of image data pieces included in the corresponding divided image data piece group are Scene 8, Scene 3, and Scene 7 in increasing order. Scene 3 and Scene 7 have an equal number of image data pieces.

Next, the CPU 101 sets Scene 8 having the lowest number of image data pieces included in the corresponding divided image data piece group as an integration target. Next, one of Scene 3 and Scene 7 is selected as an integration target because an equal number of image data pieces are included in the corresponding divided image data piece group. Here, because Scene 8 is an integration target be neighboring to Scene 7 (because Scene 7 and Scene 8 are to be integrated), Scene 3 is set as an integration target.

Next, the CPU 101 determines whether a sub-image data piece group being an integration target is to be integrated to a scene of an image data piece captured at a previous date or time in the corresponding divided image data piece group or a scene of an image data piece captured at a subsequent date or time. In this case, among the integration target scene and two scenes neighboring to the integration target scene, the CPU 101 determines that the scene having a smaller time difference in capturing date/time of image data pieces included in the corresponding divided image data piece group is to be integrated to the integration target scene. Referring to FIG. 6A, one of neighboring Scenes 2 and 4 is to be integrated to Scene 3. Here, comparing the time differences from the capturing date/times of the images included in the corresponding divided image data piece group of Scene 3 and previous and subsequent Scenes 2 and 4, the time difference between Scene 3 and Scene 4 is smaller. Therefore, the CPU 101 determines to integrate Scene 3 to Scene 4. In other words, the image data pieces are integrated at positions indicated by the broken lines in FIG. 6C.

In a case where there is only one neighboring scene, like Scene 8, the CPU 101 determines the only one neighboring scene to be integrated.

The previous and subsequent scenes of the positions indicated by the broken lines in FIG. 6C are integrated. The scene integration may include updating information describing an image file included in the scene in accordance with the scene after the integration.

In S416, the CPU 101 executes double-page spread allocation by using the double-page spread allocating unit 209. In S412 to S415, the number of scene divisions is equal to the designated number of double-page spreads. The CPU 101 allocates divided data pieces in order from the one captured at the first date/time to double-page spreads from the first spread.

In S417, the CPU 101 executes image selection by using the image selecting unit 210. An example in which four image data pieces are selected from the divided image data piece group allocate to one double-page spread will be described below with reference to FIGS. 9A to 9I.

FIG. 9A illustrates a time difference (divided capturing period) in capturing date/time between an image data piece captured at the earliest date/time and an image data piece captured at the latest date/time in the divided image data piece group allocated to a double-page spread. An image data piece is selected for a main slot and a sub-slot in that order. It is assumed here that a template corresponding to the double-page spread includes one main slot 1002. The first image data piece to be selected is an image data piece for the main slot. The CPU 101 selects an image data piece (1) at a position with the highest score for the main slot given in S410 as an image data piece for the main slot from the image data corresponding to the divided capturing period illustrated in FIG. 9B.

An image data piece to be selected secondly is an image data piece for a sub-slot. The second and subsequent image data pieces are selected such that the divided capturing periods concentrate on one part by using the following method. First, the CPU 101 divides the divided capturing period into two, as illustrated in FIG. 9C. Next, the CPU 101 selects a second image data piece from the image data pieces generated in the divided capturing period (or the period indicated by the solid line) in which the first image data piece is not selected, as illustrated in FIG. 9D. As the second image data piece, an image data piece (2) (image ID) with a highest score for a sub-slot is selected from the image data pieces generated during a divided capturing period in which the first image data piece is not selected. Next, the CPU 101 divides each divided capturing period illustrated in FIG. 9D to two as illustrated in FIG. 9E. The CPU 101 selects the third image data piece from the image data pieces generated during the divided capturing period (a period indicated by the solid line) in which the first and second image data pieces are not selected as illustrated in FIG. 9F. As the third image data piece, an image data piece (3) with a highest score for the sub-slot is selected from the image data generated during a divided capturing period in which the first and second image data pieces are not selected.

Next, a case where no image is generated during a divided capturing period in which an image data piece is to be selected and a data piece is selected from the image data generated in the divided capturing period will be described with reference to an example in which a fourth image data piece is to be selected. It is assumed here, as illustrated in FIG. 9G, that no image data is generated during a divided capturing period (shaded in FIG. 9G) in which an image data piece has not been selected yet. In this case, the CPU 101 divides each divided capturing period into two as illustrated in FIG. 9H. Next, the CPU 101 selects a fourth image data piece from the image data generated in the divided capturing period (or the period indicated by the solid line) in which no image data piece has been selected yet, excluding a divided capturing period recognized as a period in which no image data is generated, as illustrated in FIG. 9I. As the fourth image data piece, the CPU 101 selects an image data piece (4) with a highest score for a sub-slot from the image data generated during the divided capturing period.

Referring back to FIG. 4, in S418, the CPU 101 determines a template in which the image data pieces selected in S417 are laid out by using the image layout unit 212. Image layout determination processing according to this embodiment will be described below with reference to FIG. 11. An example in which the template input unit 211 inputs the templates in FIG. 10, (A) to (P), for one double-page spread in accordance with designated template information will be described below.

It is assumed here 3 is designated as an example number of slots of the input template. The three images of the selected image data pieces are arranged vertically or horizontally in order of the capturing dates and times as illustrated in (Q) in FIG. 10. It is assumed here that the image data piece 1005 is for a main slot and that the image data pieces 1006 and 1007 are for sub-slots. According to this embodiment, an image data piece captured at an older date/time is laid out in an upper left part of the template, and an image data piece captured at a later date/time is laid out in a lower right part of the template. The image data piece 1005 for a main slot is captured at the latest date/time in (Q) in FIG. 10, the templates illustrated in FIG. 10, (I) to (L) are determined as candidates. The older image data piece 1006 for a sub-slot is a vertical image, and the later image data piece 1007 is a horizontal image. As a result, the template in (J) in FIG. 10 is determined as the most suitable template for the selected three image data pieces, and the layout is determined. In S418, which image is to be laid out in which slot of which template is determined.

In S419, the CPU 101 determines whether image correction is to be performed on the image data pieces to be laid out in the template by using the image correcting unit 214. The CPU 101 performs image correction in a case where a setting that image correction is ON is input from the image correction condition input unit 213. As the image correction, dodging correction (brightness correction), red-eye correction, and contrast correction, for example, may be executed. The CPU 101 does not execute the image correction in a case where a setting that the image correction is OFF is input from the image correction condition input unit 213. The image correction can be executed on image data pieces having a size of 1200 pixels on the short side and converted to an sRGB color space. If the image correction is determined to be executed, the CPU 101 advances the processing to S420 where the image correction is executed. If the image correction is determined not to be executed, the processing moves to S421.

In S421, the CPU 101 generates layout information by using the layout information output unit 215. More specifically, the CPU 101 executes the image correction in S419 on image data pieces for slots of the template determined in S418 and lays out the image data pieces associated with the slots. In this case, the CPU 101 can scale the image data pieces to be laid out in accordance with the size information of the slots. The CPU 101 at that time may trim an image data piece corresponding to a part that lies off a slot instead of scaling of the whole image data. The CPU 101 generates bitmap data in which the image data pieces are laid out in the template by using the layout information output unit 215.

In S422, whether the processing in S417 to S421 has been performed completely for all double-page spreads or not is determined. If not, the CPU 101 repeats the processing from S417. If so, the CPU 101 exits the automatic layout processing in FIG. 4.

Through the processing as described above, image data pieces can be selected automatically from an image data piece group corresponding to a scene, and the selected image data pieces can be laid out on double-page spreads for automatic generation of an album.

Having described that, in the procedure as described above, a first image data piece is selected by using a score for a main slot and second and subsequent image data pieces are selected by using scores for sub-slots, embodiments are not limited thereto. In a case where a template having a plurality of main slots is provided in advance, a plurality of image data pieces may be selected by using scores for the main slots.

Having described the case where four image data pieces are to be selected, an embodiment is not limited thereto. In a case where a plurality of templates having different numbers of slots from each other is provided in advance, other numbers of image data pieces than four image data pieces may be selected. The number of divisions for the divided capturing period in S417 may be increased or reduced in accordance with the number of image data pieces to be selected.

The template determination processing in S418 will be described in detail. It is assumed here that templates in the album creation application have different number of slots, for example. In this case, the automatic layout processing requires proper determination of the number of slots in the template to be used. Accordingly, a method for determining a layout in a case where the album creation application has a plurality of templates having different number of slots will be described.

Figure 11:
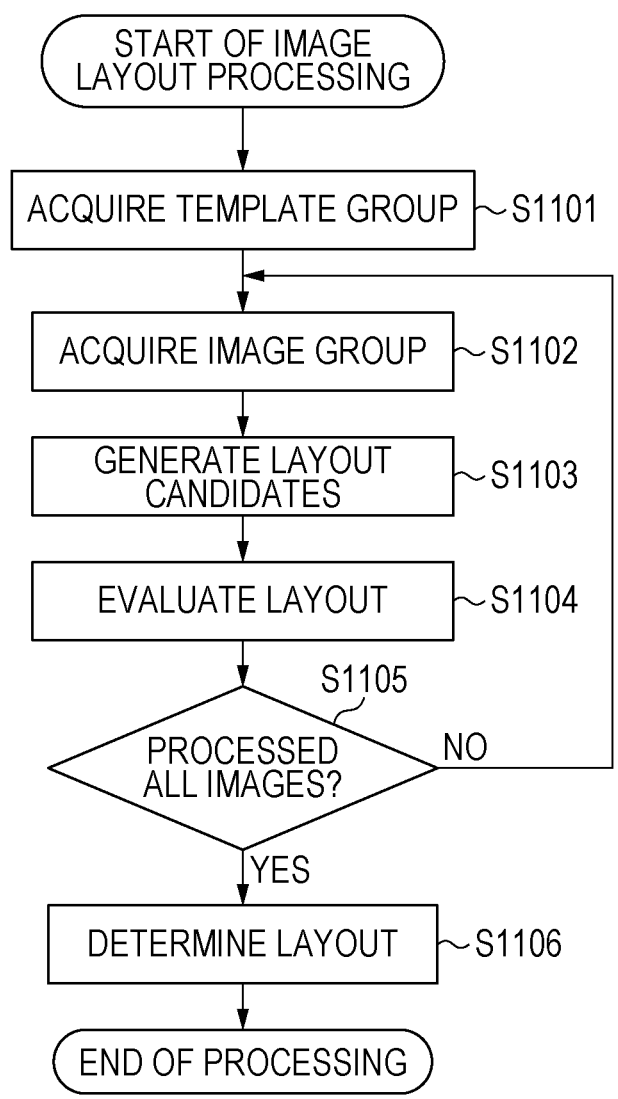
FIG. 11 is a flowchart illustrating layout processing to be performed on image data pieces.

FIG. 11 is a flowchart illustrating a procedure of the image layout processing to be performed by the image layout unit 212 in the album creation application. The flowchart illustrated in FIG. 11 can be implemented by reading out to the ROM 102 or the RAM 103 and executing a program stored in the HDD 104 by the CPU 101, for example. The processing illustrated in FIG. 11 corresponds to the processing in S418. According to this embodiment, the CPU 101 repeats the processing in S417 so that a plurality of image data pieces can be selected. As an example, the image selection in S417 selects in advance three image data piece groups including three, four, and five image data pieces. The image data piece groups may be selected based on an identical reference or different references. The number of image data pieces to be selected is not limited to three, four, or five. For example, image data piece groups including one, three, five and seven image data pieces may be selected. The number of image data pieces selectable by the CPU 101 in S417 corresponds to the number of image data pieces that can be laid out in templates held by the album creation application. Therefore, in a case where, for example, the album creation application holds templates in which three, four, and five image data pieces can be laid out, three, four and five image data pieces are selectable. The number of image data pieces to be selected by the CPU 101 in S417 (or the number of candidate image data pieces to be laid out in a finally selected template) is equal to the number that can be laid out (the number of slots) in a template held by the album creation application. However, an embodiment is not limited to this configuration, but, for example, a user may set an arbitrary number of image data pieces from the number of image data pieces that can be laid out in templates held by the album creation application, and the CPU 101 in S417 may select the set number of image data pieces.

In S1101, the CPU 101 acquires templates held by the album creation application. It is assumed here that the CPU 101 acquires 16 templates in which three to five image data pieces (or slots) can be laid out (or a total of 48 to 80 image data pieces).

In S1102, the CPU 101 acquires and analyzes image data pieces which have not undergone the processing in and after S1101 from the image data piece group selected in S417. The following description assumes that image information regarding an image data piece group including five image data pieces is to be acquired. FIG. 12A illustrates examples of the image information regarding image data pieces included in the acquired image data piece group. An image that is identifiable by an image ID is given information regarding items of a capturing date/time, focus, the number of faces, and a score. The score item is acquired as a score (on basis of a maximum of 100 points) acquired by adding scores for a main slot and a sub-slot acquired by the image scoring in S410 but may further be divided into separate items for the acquisition.

In S1103, the CPU 101 generates layout candidates in which image data pieces acquired in S1102 are laid out in the templates acquired in S1101. The CPU 101 generates layout candidates based on template information acquired through the template input unit 211.

FIG. 12B illustrates examples of the template information. A template identified by a template ID is given information regarding items of the number of slots, the width of the template, the height of the template, and a layout score.

The layout score is a score given by layout scoring, which will be described below, to a template in which image data pieces are to be laid out. Thus, the layout score item is acquired after the layout scoring, which will be described below, is performed. Here, because five image data pieces are acquired in S1102, layout candidates are generated for 16 templates each having five slots. Each of such templates is given slot information that is information regarding slots of the template. FIG. 12C illustrates examples of the slot information regarding slots in a template. A slot identified by a slot ID is given information regarding items of a chronological number, priority level, and score. The chronological number is chronological information describing a sequence number in an image data piece group of the date/time when the image data piece to be laid out is generated. For example, an image data piece generated at the earliest date/time in the image data piece group may be laid out in a slot having a chronological number 1. The priority level indicates a priority relationship among slots for determining image data pieces to be laid out. For example, the priority level of a main slot is set higher than the priority level of a sub-slot. The score is information preset in accordance with the size, position, and priority level of a slot. For example, as the score of a slot increases, the score of the image data piece to be laid out in the slot increases. Thus, the score for a main slot is set higher than the score for a sub-slot. FIGS. 13A to 13J schematically illustrate examples of slot information. For example, a slot ID "3" corresponds to a main slot, and the chronological number is 5. The priority levels and scores for a main slot are set higher than those for other slots (sub-slots).

A procedure will be described which includes associating an image data piece and slots based on the capturing date/time and score of the image data piece and the chronological numbers and priority levels of the slots to generate layout candidates. An example in which image data pieces with image information illustrated in FIG. 12A and the slots illustrated in FIG. 12C are associated.

First, the CPU 101 classifies image data pieces to a slot priority level "1" group and a slot priority level "2" group in accordance with the scores of the image data pieces. Because one slot with the priority level "1" is provided, an image data piece with an image ID "214" and with a high score is first classified into the priority level "1" group. The CPU 101 then classifies other image data pieces with image IDs "25", "86", "102", and "108" into the priority level "2" group. Having described the example in which two priority levels are provided, for example, the CPU 101 may classify image data pieces into three groups in accordance with the scores of the image data pieces and the number of slots if three priority levels are provided.

Figure 13A:
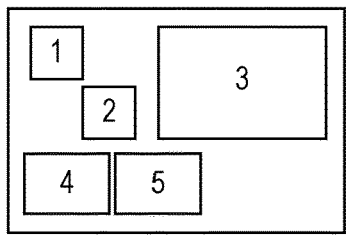
FIGS. 13A to 13J illustrate slot information included in templates.
Figure 13B:
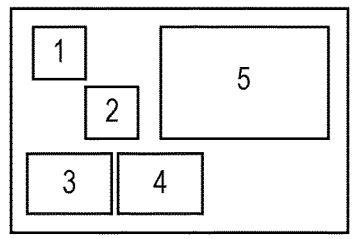
Figure 13C:
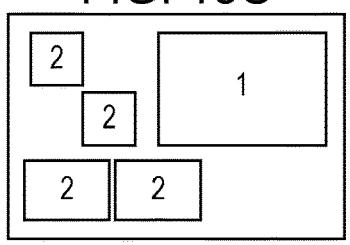
Figure 13D:
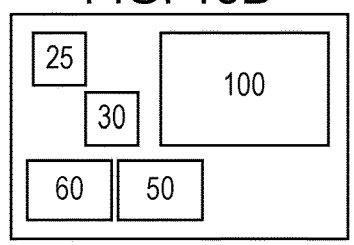
Figure 13E:
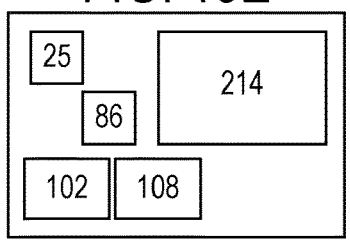
Figure 13F:
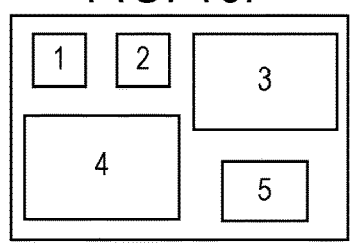
Figure 13G:
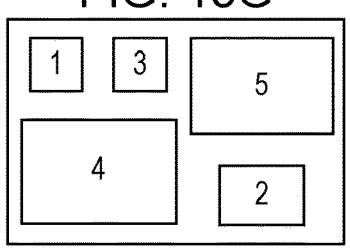
Figure 13H:
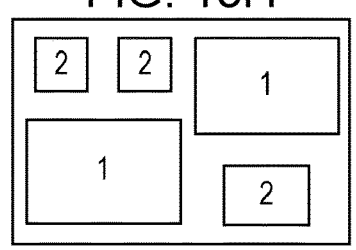
Figure 13I:
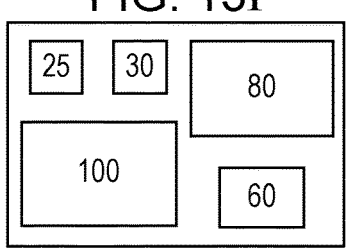

Next, the CPU 101 sorts the image data pieces within each of the groups in order of capturing dates/times. After that, the CPU 101 associates the image data pieces and slots in accordance with information regarding the priority levels and chronological numbers set to the slots. More specifically, the CPU 101 first associates an image data piece with an image ID "214" and a slot with a priority level "1". Because there is one slot with a priority level "1", the CPU 101 associates the image data piece with the image ID "214" and the slot with the slot ID "3", irrespective of the chronological number. Next, the CPU 101 associates image data pieces with image IDs "25", "86", "102", and "108" and a slot with a priority level "2". Because there are four slots with the priority level "2", the CPU 101 associates an image data piece with an image ID "25" captured at the earliest date/time in the group with a priority level "2" with a slot with the lowest chronological number. The CPU 101 further associates an image data piece with an image ID "86" captured at the second earliest date/time in the group with the priority level "2" with a slot with the second lowest chronological number. The CPU 101 further performs such association with the other slots. As a result, as illustrated in FIG. 13E, image data pieces to be laid out in slots are determined. The CPU 101 may perform the procedure as described above on all of the templates acquired in S1101 and having five slots to generate layout candidates. Here, layout candidates are generated for 16 templates each having five slots.

In S1104, the CPU 101 evaluates the layout candidate (16 layout candidates here) and performs layout scoring thereon. The layout scoring refers to giving a score (scoring) as a result of an evaluation from viewpoints, which will be described below, for each layout candidate, and the score is referred for selecting a layout to be actually output. According to this embodiment, each layout candidate is scored from two viewpoints of a time element and a score element.

Details of the layout scoring will be described. A chronological number and a score are set for each slot in consideration of the capturing times and scores of image data pieces to be laid out in a template for a higher degree of user satisfaction. Therefore, in a layout candidate, the chronological numbers and scores set for slots may be matched to the sequence orders of the capturing date/time and scores of image data pieces associated with the slots. Accordingly, the CPU 101 performs scoring based on the strength of correlation between the chronological numbers and scores set for slots and the sequence orders of the capturing date/time and scores of image data pieces associated with the slots.

For example, FIG. 13E illustrate a layout candidate generated by associating image data pieces having image information illustrated in FIG. 12A with slots of a template having characteristics illustrated in FIG. 12C. It is assumed here that each data array is expressed by (xi,yi) where xi=a sequence number of capturing date/time of an image data piece associated with a slot with a slot number i and yi=a chronological number corresponding to the slot number i. As the difference between xi and yi decreases, the strength of correlation between a slot and an image data piece associated with the slot can increase. Therefore, a high score is given thereto. For example, an image data piece with an image ID "25" is associated with a slot number 1. Here, the sequence number of the capturing date/time of the image data piece with the image ID "25" within the selected image data group is "1", and the chronological number set for the slot number 1 is "1". Thus, (1,1) is acquired as a data array of the time element of the layout candidate in FIG. 13E. Also, when other data arrays are acquired, data arrays of the time element of the layout candidate in FIG. 13E are (1,1), (2,2), (3,3), (4,4), and (5,5).

Figure 13J:
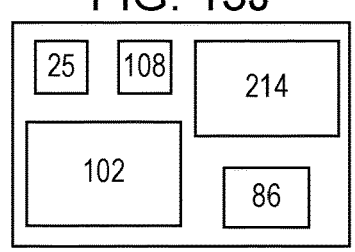

In the same manner, data arrays are acquired with respect to the score element. Each data array is expressed by (xi,yi) where xi=a score of an image data piece associated with a slot with a slot number i, and yi=a score corresponding to the slot number i. For example, the image data piece with the image ID "25" is associated with the slot with the slot number 1. Here, the score of the image data piece with the image ID "25" within the selected image data group is "20", and the score set for the slot with the slot number 1 is "25". Thus, (20,25) is first acquired as a data array of the time element of the layout candidate in FIG. 13E. In the same manner, other data arrays of the score element of the layout candidate in FIG. 13E are (20,25), (25,30), (45,50), (55,60), (90,100). In the layout candidate illustrated in FIG. 13E, there is a slight difference between xi and yi with respect to both of the elements, which means that the strength of correlation of the slots and the image data pieces associated with the slots is high. Therefore, a high score is given. On the other hand, FIG. 13J illustrates a layout candidate generated by associating image data having image information illustrated in FIG. 12A with the slots of the template having characteristics illustrated in FIG. 12D. The data arrays of the time element of the layout candidate in FIG. 13J are (1,1), (2,2), (3,4), (4,3), and (5,5). The data arrays of the score element are (20,25), (25,60), (45,30), (55,100), and (90,80). In the layout candidate illustrated in FIG. 13E, there is a larger difference between xi and yi with respect to both of the elements than the layout candidate illustrated in FIG. 13E. Therefore, a low score is given.

Figure 14A:
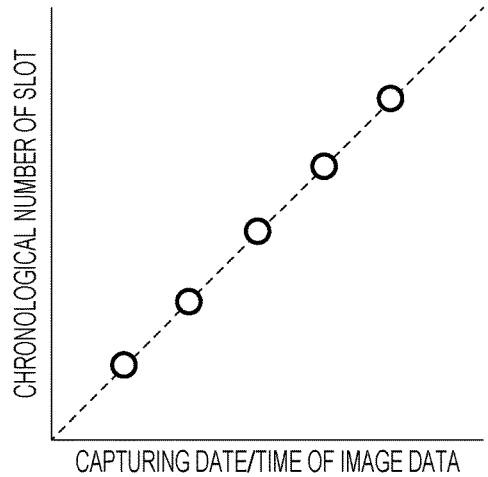
FIGS. 14A to 14D illustrate correlations among elements for evaluating a layout.
Figure 14C:
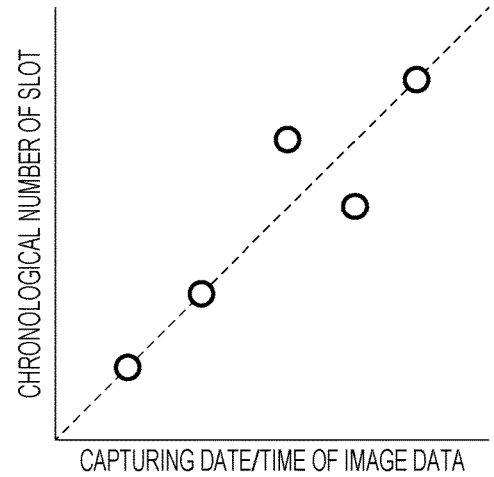

For the layout scoring, the CPU 101 calculates coefficients of correlation for the elements from the correlations between slots and image data pieces associated with the slots. FIG. 14A illustrates a correlation with respect to the time element in a layout candidate illustrated in FIG. 13E. FIG. 14C illustrates a correlation with respect to the time element in a layout candidate illustrated in FIG. 13J. In FIGS. 14A and 14C, each data arrays is expressed by (xi,yi) (xi=sequence number of the capturing date/time of an image data piece associated with a slot with a slot number i and yi=a chronological number of the slot number i). In FIGS. 14A and 14C, though the x axis represents the sequence number of the capturing date/time of an image data piece and the y axis represents the chronological number of a slot, the x axis may represent the capturing date/time of an image data piece.

Figure 14B:
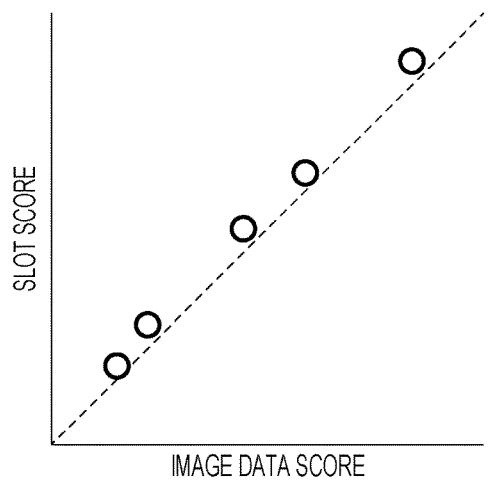
Figure 14D:
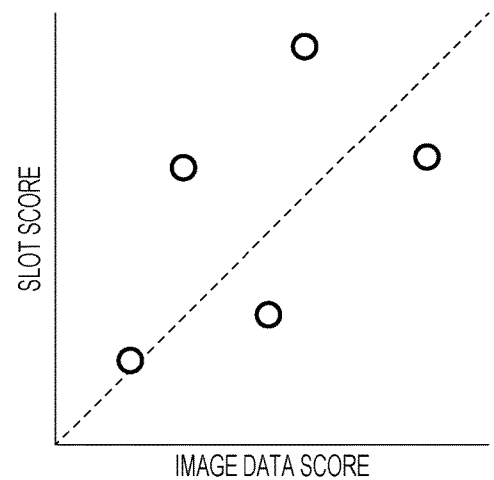

FIG. 14B illustrates a correlation with respect to the score element in the layout candidate illustrated in FIG. 13E. FIG. 14D illustrates a correlation with respect to the score element in the layout candidate illustrated in FIG. 13J. In FIGS. 14B and 14D, each data array is expressed by (xi,yi) (xi=a score of an image data piece associated with a slot with a slot number i, and yi=a score corresponding to the slot number i). In FIGS. 14B and 14D, both of the x-axis and the y-axis represent scores, but they may represent sequence numbers of the scores.

In the drawings illustrating correlations, as the approximation degree between the approximate straight line of a data array and the straight line expressed by x=y increases, the strength of correlation between a slot and an image data pieces associated with the slot may increase.

The layout scoring is performed by calculating and adding coefficients of correlation and normalizing it on basis of a maximum of 100 points) from the drawings illustrating correlations with respect to the time element and score element of each layout candidate. In other words, a layout score is calculated as in Expression (5).

Score=50×(coefficient r1 of correlation of time element+coefficient r2 of correlation of score element)/2+50     (5)

Here, the coefficients r1 and r2 of correlation are acquired by using Expression (6).

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad (6)$$

where $\bar{x}$ and $\bar{y}$ are arithmetic averages of data x and y, respectively.

The coefficients of correlation are indices for calculating the strength of correlation of each of the elements, irrespective of the number (number of slots) of data arrays. The indices may be applied to templates having any number of slots so that the fittability of a layout can be uniformly determined independently from the number of image data pieces to be laid out. This procedure may be performed on all of the templates acquired in S1101 to evaluate layout candidates. The layout score items in FIG. 12B are merely examples of results of layout scoring.

Figures 16, 17:
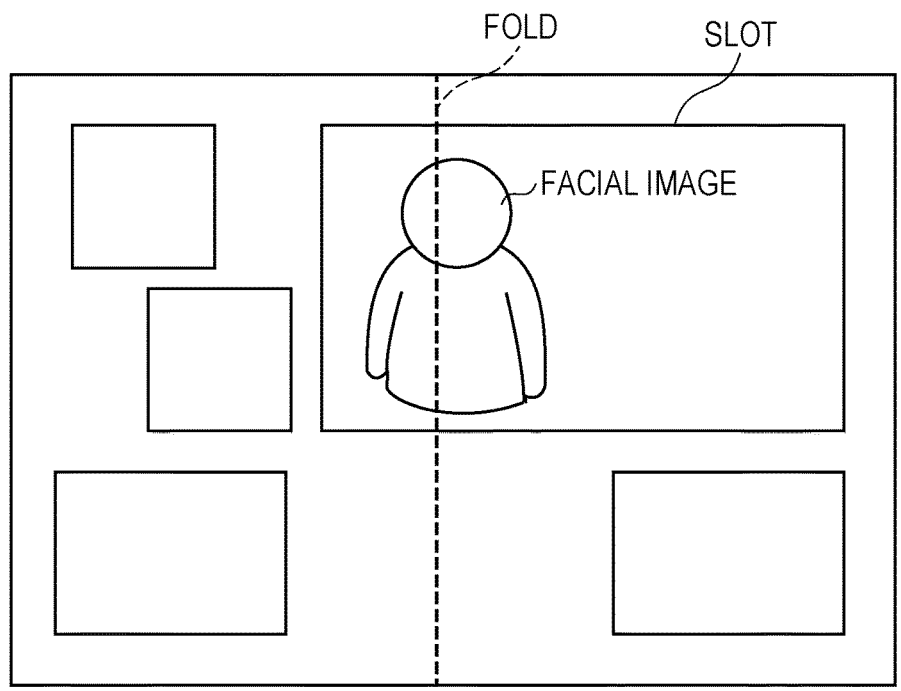
FIG. 16 illustrates template information under categories.
FIG. 17 illustrates a layout candidate of a facial image.

Having described that a layout score is calculated from a correlation between a time element and a score element, an embodiment is not limited thereto. For example, a correlation between an aspect ratio of a slot and an aspect ratio of an image data piece associated with the slot may also be included in elements of the layout scoring. In this case, for example, as the difference between an aspect ratio of a slot and an aspect ratio of an image data piece associated with the slot decreases, the score to be given increases. Whether the resolution of a slot and the resolution of an image data piece associated with the slot are sufficient or not may be included in the elements of the layout scoring. For example, in a case where the resolution of an image data piece associated with a slot is not sufficient for the resolution of the slot, a score acquired by subtracting a predetermined number of points from normalized points. For example, whether a facial image is to be laid out in a part corresponding to a fold line of a double-page spread or not may be included in the elements of the layout scoring. In this case, for example, as illustrated in FIG. 17, a layout candidate in which a facial image is laid out in a part corresponding to the fold line of a double-page spread is given a score acquired by subtracting a predetermined number of points from a number of points normalized by the correlation function. In a case where an object such as an animal such as a dog and a cat, flower, food, a building, and an ornament or a part excluding a facial image of a human figure image is laid out in a part corresponding to the fold line of a double-page spread, the scoring as described above may be performed. The number of points to be subtracted from the normalized number of points may be changed in accordance with the object to be laid out in the part corresponding to the fold line.

In S1105, the CPU 101 determines whether the all image data pieces of the image data piece group selected by the image selection in S417 have processed in S1102 to S1104 or not. If not, the CPU 101 returns the processing to S1102 where another image data piece group is acquired. If so, the processing moves to S1105. For example, it is assumed that an image data piece group including five image data pieces is acquired in S1102 and that the layout candidate generation and the layout scoring performed on 16 templates each having five slots have completed in S1104. Accordingly, in a case where the processing in S1102 to S1104 has not performed on the image data piece group including another number of image data pieces, the processing returns to S1102 where an image data piece group including three image data pieces, for example, is acquired. The layout candidate generation and layout scoring are performed on the 16 templates each having three slots in S1104.

In S1106, the CPU 101 selects a template corresponding to the layout candidate with the highest layout score of all layout candidates from all layout candidates having undergone the layout scoring in S1104. Therefore, according to this embodiment, as illustrated in FIG. 12B, a template ID "47" corresponding to a layout candidate with the highest score "98" of 48 templates is selected. After that, the CPU

101 exits the template determination processing and advances the processing to S419.

As described above, according to this embodiment, a layout in a template having a proper number of slots can be determined in accordance with characteristics of image data pieces. The layout scoring can be performed on templates having any number of slots on basis of an identical evaluation reference so that an optimum layout result can be acquired even when the album creation application holds a plurality of templates having different characteristics.

Second Embodiment

According to this embodiment, the template determination processing will be described in a case where the album creation application has a plurality of templates having not only a different number of slots from each other but also different elements. For example, the templates may include various types (categories) of template such as templates including slots having various shapes such as a round slot and a diamond-shaped slot in addition to a rectangular slots and templates in which slots are overlapped with each other. According to this embodiment, an example in which templates under different categories can be selected will be described. It is assumed here that three categories are available including a template category including a round slot, a template category including a diamond-shaped slot, and a template category including a round slot and a diamond-shaped slot. Each of the categories includes 48 templates including three, four or five slots.

Figure 15:
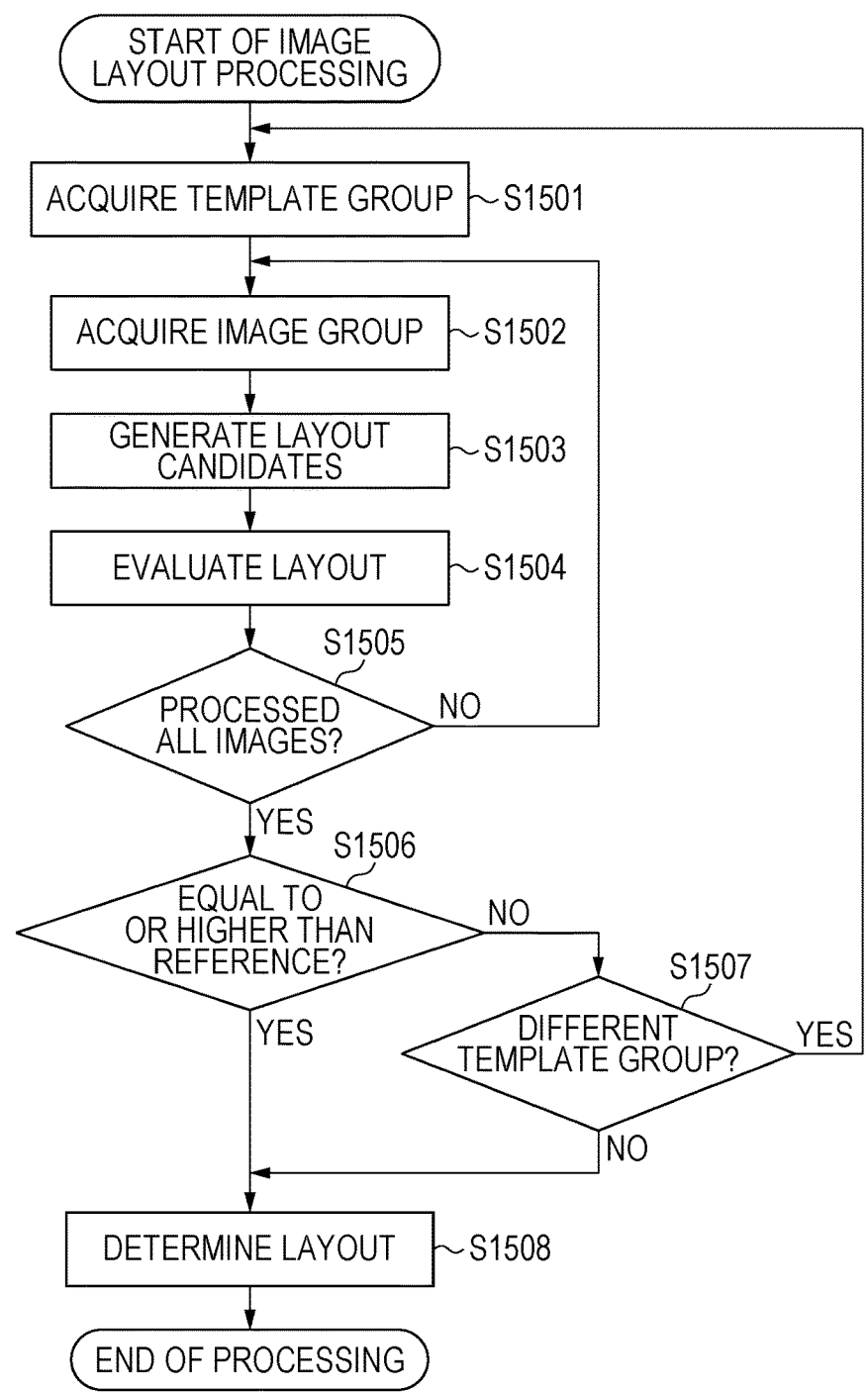
FIG. 15 is a flowchart illustrating layout processing to be performed on image data pieces.

FIG. 15 is a flowchart illustrating a procedure for image layout processing in the image layout unit 212 of the album creation application. Processing in the flowchart illustrated in FIG. 15 may be implemented by reading out to the ROM 102 or the RAM 103 and executing a program stored in the HDD 104 by the CPU 101, for example. The processing illustrated in FIG. 15 corresponds to the processing in S418.

In S1501, the CPU 101 acquires a template belonging to a predetermined category of the templates held in the album creation application.

FIG. 16 illustrates examples of category information of templates. Each of the categories has information regarding items of "ROUND", "DIAMOND-SHAPED" and a template ID. Under the items "ROUND" and "DIAMOND-SHAPED", "YES" is given if the corresponding template includes round or diamond-shaped slot. For example, Category "2" includes a template group including templates with template IDs 49 to 96 including a round slot. The order of categories to be acquired in S1501 is preset in accordance with the number of double-page spreads of an album such that layouts in templates belonging to different categories between double-page spreads neighboring to each other within the album can be selected. In S1501, the CPU 101 acquires templates for preventing the resulting album from having monotonous layouts.

Because processing in S1502 to S1505 is the same as the processing in S1102 to S1105 in FIG. 11, any repetitive description will be omitted.

In S1506, the CPU 101 determines whether all of the layout candidates generated in S1103 and evaluated in S1104 is equal to or higher than a reference or not. More specifically, the CPU 101 determines whether a layout score of each of the layout candidates is equal to or higher than a reference value or not. If it is determined that not all of the templates are equal to or higher than the reference, the CPU 101 advances the processing to S1507. On the other hand, if it is determined that all of the layout candidates is equal to or higher than the reference, the CPU 101 advances the processing to S1508. Execution of the determination as described above can assure that the layout results meet or exceed the standards, which can prevent a layout result below the standards from being determined.

In S1507, the CPU 101 determines whether there is any category under which no template has been acquired in S1101 or not. If it is determined that there is a category under which no template has been acquired in S1101, the CPU 101 returns the processing to S1501 where a template of the category which has not been acquired in S1101 is acquired. On the other hand, if it is determined that there is no category under which no template has been acquired in S1101, the CPU 101 advances the processing to S1508. Execution of this determination as described above can prevent re-acquisition of a template group from being repeated, which prevents the processing to end.

Because the processing in S1508 is the same as the processing in S1106 in FIG. 11, any repetitive description will be omitted. In S1508, a template is determined based on a layout candidate generated based on a template belonging to one category. However, an embodiment is not limited thereto. For example, in S1508, a template may be determined from layout candidates generated based on templates of all categories, independently from the determination result in S1506. In this case, layout evaluation results of layout candidates generated based on templates of categories may be held in a storage region, and a layout with the highest score may be determined among them.

This configuration can assure that the layout results meet standards and that different templates are selected between double-page spreads, which can prevent an album having monotonous layouts to be output.

Other Exemplary Embodiments

According to the aforementioned embodiments, points are given as a result of an evaluation such as scene classification scoring, image scoring, and layout scoring. Embodiments are not limited thereto. In other words, scores may not be used for evaluations. For example, evaluations of "VERY GOOD", "GOOD", "NOT BAD", and "BAD" in order from the highest evaluation, and scene classification, image selection, and layout candidate generation may be performed based on the given evaluations.

In a case where the template determination processing is to be performed on a plurality of double-page spreads, the same template as that used for the immediately preceding double-page spread or within the same album or templates belonging to the same category may not be determined as a template or templates to be used. In this case, for example, information regarding at least a template used for the immediately preceding double-page spread may be held in a storage region, information regarding templates other than templates to be excluded may be acquired in the processing in S1101 or S1501. Alternatively, in the processing in S1103 or S1503, layout candidates relating to templates to be excluded may not be generated. Use of different templates between neighboring double-page spreads within an album can prevent similar layouts from being selected for the neighboring double-page spreads.

The templates used according to the aforementioned embodiments are different in number of slots, shape of slots, size of slots, and so on. However, other elements may differ. For example, the design of a region excluding slots in a template or the size of the whole template may differ.

An embodiment may be implemented by processing including supplying a program implementing one or more functions of the aforementioned embodiments to a system or an apparatus via a network or through a storage medium and reading and executing the program by one or more processors in a computer in the system or apparatus. An embodiment may alternatively be implemented by a circuit (such as an ASIC) implementing the one or more functions.

According to an embodiment, layout target image data pieces may be laid out in a template suitable for the layout target image data pieces, and a layout result therefrom can be output.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-255238, filed Dec. 25, 2015, which is hereby incorporated by reference herein in its entirety.

What is claimed is:

1. A control method for an image processing apparatus, the control method comprising:
acquiring, as a first acquiring, at least a first template group having a first number of image data layout regions and including a plurality of templates having different layouts from each other and a second template group having a second number, different from the first number, of image data layout regions and including a plurality of templates having different layouts from each other;
acquiring, as a second acquiring, at least a first layout candidate information group including a plurality of layout candidate information pieces generated based on the first number of image data pieces and the plurality of templates included in the first template group and a second layout candidate information group including a plurality of layout candidate information pieces generated based on the second number of image data pieces and the plurality of templates included in the second template group;
evaluating a plurality of layout candidate information pieces at least including the layout candidate information pieces in the first layout candidate information group and in the second layout candidate information group to provide an evaluation;
selecting a template corresponding to one layout candidate information piece of the evaluated plurality of layout candidate information pieces based on the evaluation; and
outputting a layout result based on the selected template.

2. The control method according to claim 1, wherein the evaluating includes evaluating layout candidate information pieces included in the first layout candidate information group based on correlations between characteristics of the first number of image data pieces and the image data layout region in the plurality of templates included in the first template group and evaluates layout candidate information pieces included in the second layout candidate information group based on correlations between characteristics of the second number of image data pieces and the image data layout region in the plurality of templates included in the second template group.

3. The control method according to claim 1, wherein the evaluating includes evaluating layout candidate information pieces included in the first layout candidate information group based on differences between values based on characteristics of the image data pieces included in the first image group and set values set for the image layout regions in the plurality of templates included in the first template group and evaluates layout candidate information pieces included in the second layout candidate information group based on differences between values based on characteristics of the image data pieces included in the second image group and set values set for the image layout regions in the plurality of templates included in the second template group.

4. The control method according to claim 1, wherein characteristics of image data pieces included in the first image group include at least one of capturing dates/times of the image data pieces included in the first image group, scores for the image data pieces included in the first image group, and sizes of the image data pieces included in the first image group.

5. The control method according to claim 1,
wherein the second acquiring acquires the first template group belonging to a predetermined category of a plurality of categories and a plurality of second template groups, and
wherein the predetermined category is different from the category to which the template corresponding to the layout result already output belongs.

6. The control method according to claim 1, further comprising:
acquiring, as a third acquiring and in a case where not all evaluations for the plurality of layout candidate information pieces are equal to or higher than a threshold value, at least a third template group having the first number of image data layout regions, including a plurality of templates having different layouts from each other and belonging to a category that is different from a category to which the first template group belongs and a fourth template group having the second number of image data layout regions, including a plurality of templates having different layouts from each other and belonging to a category that is different from a category to which the second template group belongs; and acquiring, as a fourth acquiring and in a case where not all evaluations for the plurality of layout candidate information pieces are equal to or higher than the threshold value, at least a third layout candidate information group including a plurality of layout candidate information pieces generated based on the first number of image data pieces and the plurality of templates included in the third template group and a fourth layout candidate information group including a plurality of layout candidate information pieces generated based on the second number of image data pieces and the plurality of templates included in the fourth template group, wherein the evaluating further includes evaluating, in a case where not all evaluations for the plurality of layout candidate information pieces are equal to or higher than the threshold value, a plurality of layout candidate information pieces at least including the layout candidate information pieces in the third layout candidate information group and in the fourth layout candidate information group and not including the layout candidate information pieces in the first layout candidate information group and in the second layout candidate information group, and wherein the selecting includes selecting, in a case where not all evaluations for the plurality of layout candidate information pieces are equal to or higher than the threshold value, a template corresponding to one layout candidate information piece of the plurality of layout candidate information pieces at least including the layout candidate information pieces in the third layout candidate information group and in the fourth layout candidate information group and not including the layout candidate information pieces in the first layout candidate information group and in the second layout candidate information group based on the further evaluation.

7. The control method according to claim 1, wherein templates included in the first template group and templates included in the second template group are different in at least one of shapes of the image layout region, sizes of the image layout regions, and positions of the image layout regions.

8. The control method according to claim 1, further comprises displaying the output layout result.

9. An image processing apparatus comprising:
at least one processor;
a record medium storing instructions that, when executed by the at least one processor, perform:
acquiring, as a first acquiring, at least a first template group having a first number of image data layout regions and including a plurality of templates having different layouts from each other and a second template group having a second number, different from the first number, of image data layout regions and including a plurality of templates having different layouts from each other;
acquiring, as a second acquiring, at least a first layout candidate information group including a plurality of layout candidate information pieces generated based on the first number of image data pieces and the plurality of templates included in the first template group and a second layout candidate information group including a plurality of layout candidate information pieces generated based on the second number of image data pieces and the plurality of templates included in the second template group;

evaluating a plurality of layout candidate information pieces at least including the layout candidate information pieces in the first layout candidate information group and in the second layout candidate information group to provide an evaluation;
selecting a template corresponding to one layout candidate information piece of the evaluated plurality of layout candidate information pieces based on the evaluation; and
outputting a layout result based on the selected template.

10. The image processing apparatus according to claim 9, wherein the evaluating evaluates layout candidate information pieces included in the first layout candidate information group based on correlations between characteristics of the first number of image data pieces and the image data layout region in the plurality of templates included in the first template group and evaluates layout candidate information pieces included in the second layout candidate information group based on correlations between characteristics of the second number of image data pieces and the image data layout region in the plurality of templates included in the second template group.

11. The image processing apparatus according to claim 9, wherein the evaluating evaluates layout candidate information pieces included in the first layout candidate information group based on differences between values based on characteristics of the image data pieces included in the first image group and set values set for the image layout regions in the plurality of templates included in the first template group and evaluates layout candidate information pieces included in the second layout candidate information group based on differences between values based on characteristics of the image data pieces included in the second image group and set values set for the image layout regions in the plurality of templates included in the second template group.

12. The image processing apparatus according to claim 9, wherein characteristics of image data pieces included in the first image group include at least one of capturing dates/times of the image data pieces included in the first image group, scores for the image data pieces included in the first image group, and sizes of the image data pieces included in the first image group.

13. The image processing apparatus according to claim 9, wherein the second acquiring acquires the first template group belonging to a predetermined category of a plurality of categories and a plurality of second template groups, and
wherein the predetermined category is different from the category to which the template corresponding to the layout result already output belongs.

14. The image processing apparatus according to claim 9, further comprising:
acquiring, as a third acquiring, in a case where not all evaluations for the plurality of layout candidate information pieces are equal to or higher than a threshold value, at least a third template group having the first number of image data layout regions, including a plurality of templates having different layouts from each other and belonging to a category that is different from a category to which the first template group belongs and a fourth template group having the second number of image data layout regions, including a plurality of templates having different layouts from each other and belonging to a category that is different from a category to which the second template group belongs; and acquiring, as a fourth acquiring, in a case where not all evaluations for the plurality of layout candidate information pieces are equal to or higher than the threshold value, at least a third layout candidate information group including a plurality of layout candidate information pieces generated based on the first number of image data pieces and the plurality of templates included in the third template group and a fourth layout candidate information group including a plurality of layout candidate information pieces generated based on the second number of image data pieces and the plurality of templates included in the fourth template group, wherein the evaluating further evaluates, in a case where not all evaluations for the plurality of layout candidate information pieces are equal to or higher than the threshold value, a plurality of layout candidate information pieces at least including the layout candidate information pieces in the third layout candidate information group and in the fourth layout candidate information group and not including the layout candidate information pieces in the first layout candidate information group and in the second layout candidate information group, and wherein the selecting selects, in a case where not all evaluations for the plurality of layout candidate information pieces are equal to or higher than the threshold value, a template corresponding to one layout candidate information piece of the plurality of layout candidate information pieces at least including the layout candidate information pieces in the third layout candidate information group and in the fourth layout candidate information group and not including the layout candidate information pieces in the first layout candidate information group and in the second layout candidate information group based on the further evaluation.

15. The image processing apparatus according to claim 9, wherein templates included in the first template group and templates included in the second template group are different in at least one of shapes of the image layout region, sizes of the image layout regions, and positions of the image layout regions.

16. The image processing apparatus according to claim 9, further comprises a display for displaying the output layout result.

17. A record medium storing a program to cause an image processing apparatus to perform a control method, the control method comprising:

acquiring, as a first acquiring, at least a first template group having a first number of image data layout regions and including a plurality of templates having different layouts from each other and a second template group having a second number, different from the first number, of image data layout regions and including a plurality of templates having different layouts from each other;

acquiring, as a second acquiring, at least a first layout candidate information group including a plurality of layout candidate information pieces generated based on the first number of image data pieces and the plurality of templates included in the first template group and a second layout candidate information group including a plurality of layout candidate information pieces generated based on the second number of image data pieces and the plurality of templates included in the second template group;

evaluating a plurality of layout candidate information pieces at least including the layout candidate information pieces in the first layout candidate information group and in the second layout candidate information group to provide an evaluation;

selecting a template corresponding to one layout candidate information piece of the evaluated plurality of layout candidate information pieces based on the evaluation; and outputting a layout result based on the selected template.

* * * * *